US012194737B2

(12) United States Patent
Saito

(10) Patent No.: US 12,194,737 B2
(45) Date of Patent: Jan. 14, 2025

(54) PRINTING APPARATUS

(71) Applicant: Brother Kogyo Kabushiki Kaisha, Nagoya (JP)

(72) Inventor: Shingo Saito, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 100 days.

(21) Appl. No.: 18/056,296

(22) Filed: Nov. 17, 2022

(65) Prior Publication Data

US 2023/0166539 A1 Jun. 1, 2023

(30) Foreign Application Priority Data

Nov. 26, 2021 (JP) ................................. 2021-192302

(51) Int. Cl.
*B41J 11/70* (2006.01)
*B41J 11/00* (2006.01)

(52) U.S. Cl.
CPC ............ *B41J 11/70* (2013.01); *B41J 11/0005* (2013.01); *B41J 11/005* (2013.01)

(58) Field of Classification Search
CPC ........ B41J 11/70; B41J 11/005; B41J 11/0005
See application file for complete search history.

(56) References Cited

U.S. PATENT DOCUMENTS

2010/0045726 A1 2/2010 Nakajima et al.
2013/0271518 A1* 10/2013 Morita .................. B41J 25/308 347/8

FOREIGN PATENT DOCUMENTS

JP 09071015 A * 3/1997 ............. B41J 11/70
JP H09-071015 A 3/1997
JP 2010-046935 A 3/2010

* cited by examiner

*Primary Examiner* — Yaovi M Ameh
(74) *Attorney, Agent, or Firm* — Element IP, PLC

(57) ABSTRACT

A printing apparatus, having a platen to support a printing medium unrolled from a roll, a conveyer to convey the printing medium on the platen in a first direction, a head to print an image on the printing medium supported by the platen at a position on one side of the platen in a second direction intersecting with the first direction, a corrugating member to corrugate the printing medium, and a cutter to cut the printing medium, is provided. The corrugating member has a plurality of ribs and presser portions. The plurality of ribs align spaced from one another in a third direction, which intersects with the first direction and the second direction. The plurality of ribs protrude from the platen in the second direction. The presser portions press the printing medium toward the platen at intervening positions between adjoining ones of the plurality of ribs.

7 Claims, 14 Drawing Sheets

PRINTING APPARATUS

REFERENCE TO RELATED APPLICATIONS

This application claims priority from Japanese Patent Application No. 2021-192302 filed on Nov. 26, 2021. The entire content of the priority application is incorporated herein by reference.

BACKGROUND ART

The present disclosure is related to a printing apparatus.

A printing apparatus for printing images with use of a rolled sheet is known. The printing apparatus may have a cutter for cutting the sheet from the roll and a printing head for printing images on the sheet cut off by the cutter.

DESCRIPTION

In the known printing apparatus, the sheet may be unrolled from the roll and cut by the cutter before the printing head prints the images. The sheet unrolled and cut off from the roll may tend to curl. The curled sheet may touch the printing head and may be smeared with ink from the printing head.

The present disclosure is advantageous in that a printing apparatus, in which a printing medium is restrained from touching a printing head when the printing head prints an image on the printing medium unrolled from a roll, is provided.

EMBODIMENT

In the following paragraphs, with reference to the accompanying drawings, a printing apparatus 10 according to an embodiment of the present disclosure will be described. It is noted that the printing apparatus 10 described below is merely an exemplary embodiment of the present disclosure, and various connections may be set forth between elements in the following description. These connections in general and, unless specified otherwise, may be direct or indirect and that this specification is not intended to be limiting in this respect.

<Configuration of Printing Apparatus>

Figure 1:
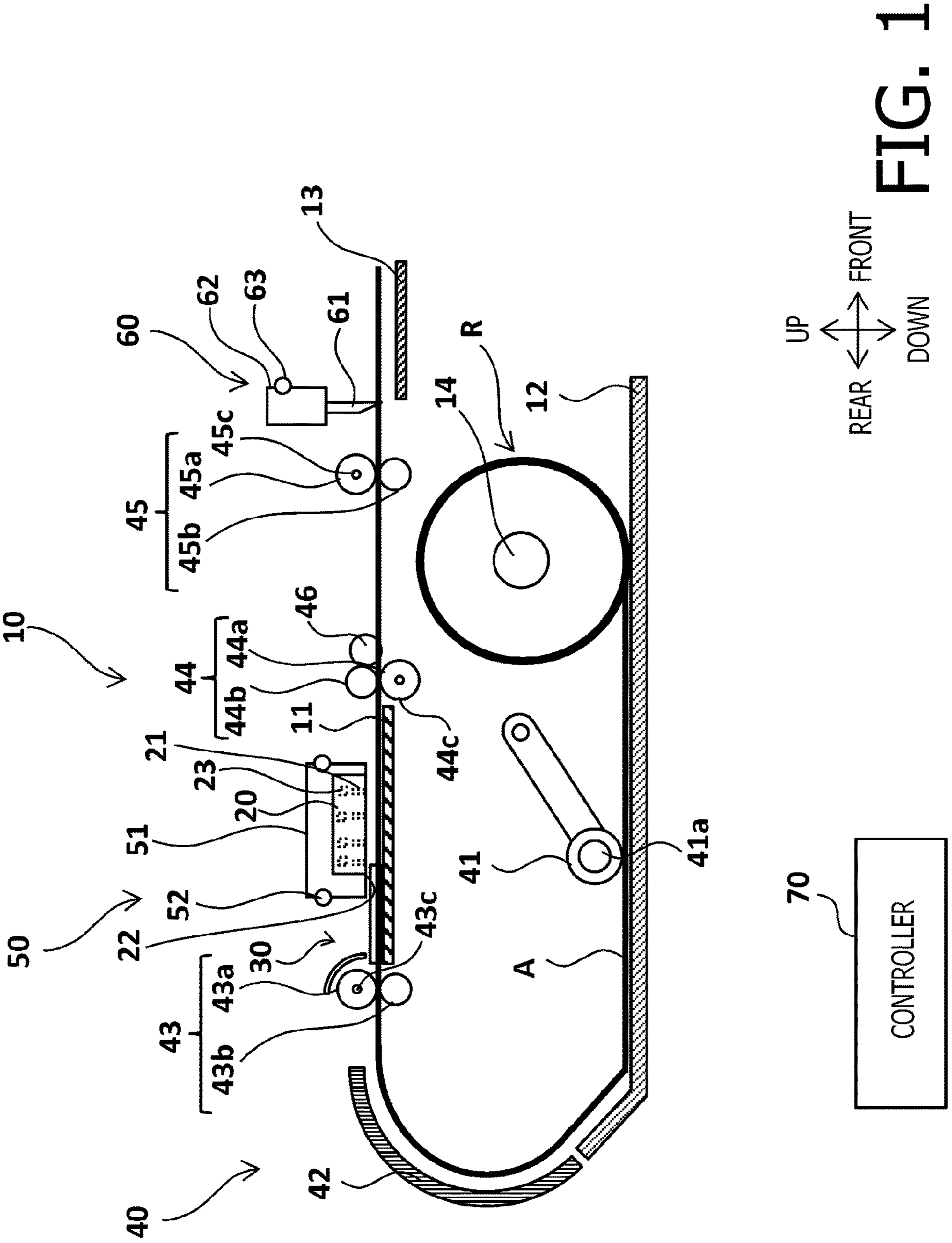
FIG. 1 is a cross-sectional sideward view of a printing apparatus.
Figure 2:
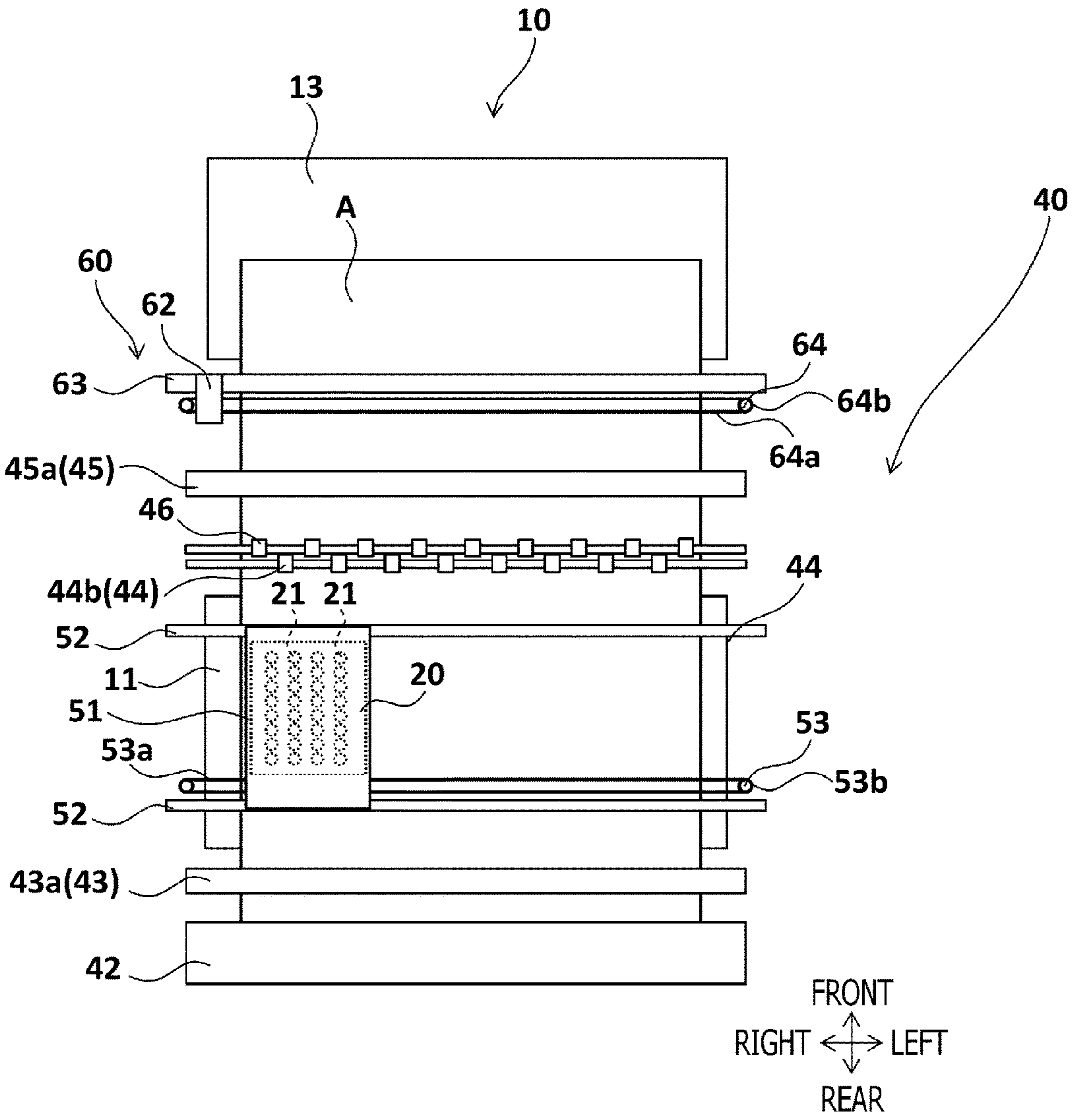
FIG. 2 is a top plan view of the printing apparatus.
Figure 3:
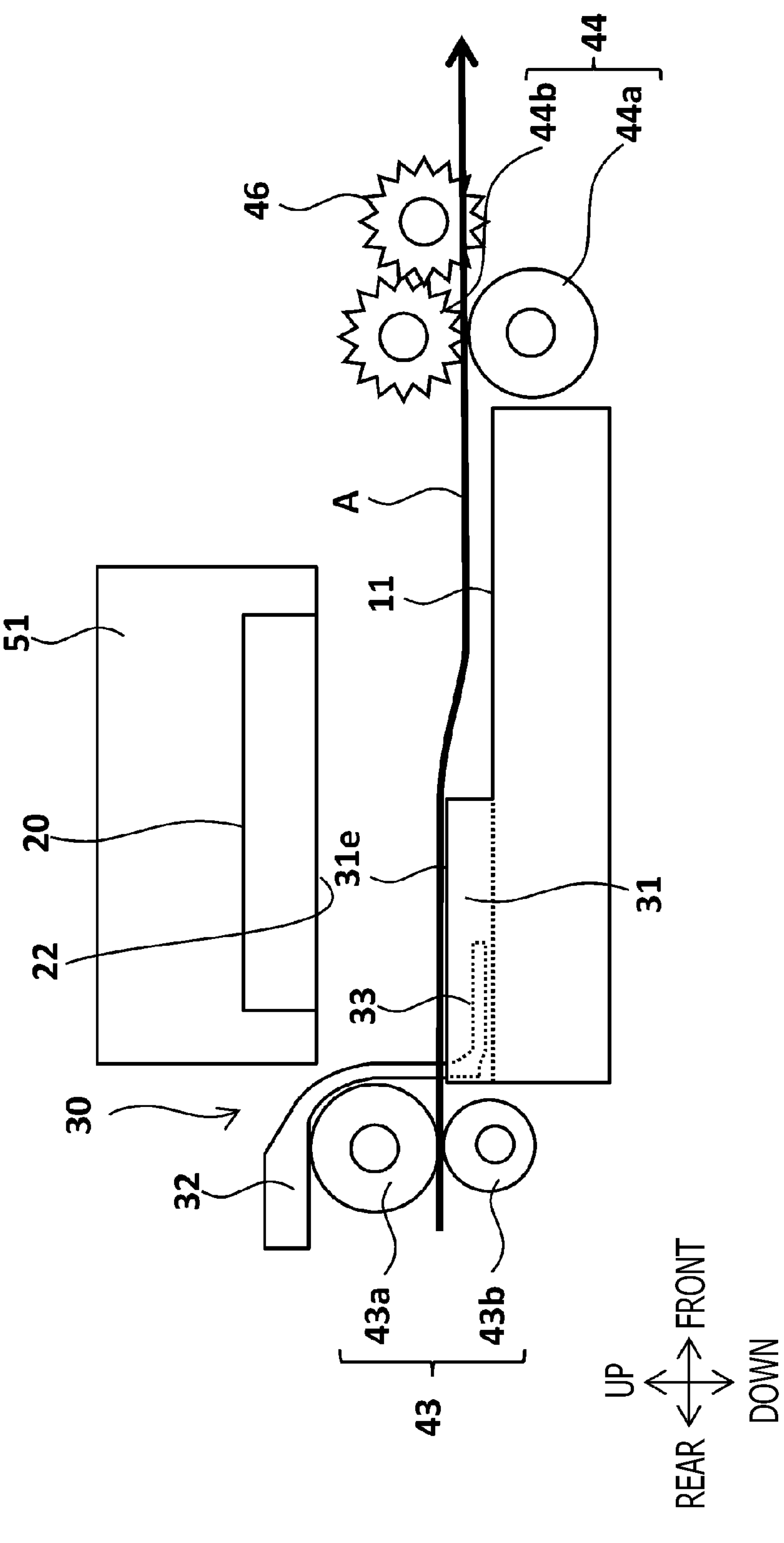
FIG. 3 is a sideward view of a corrugating member and a conveyer viewed at a position where a printing medium moves on ribs in the printing apparatus.
Figure 4:
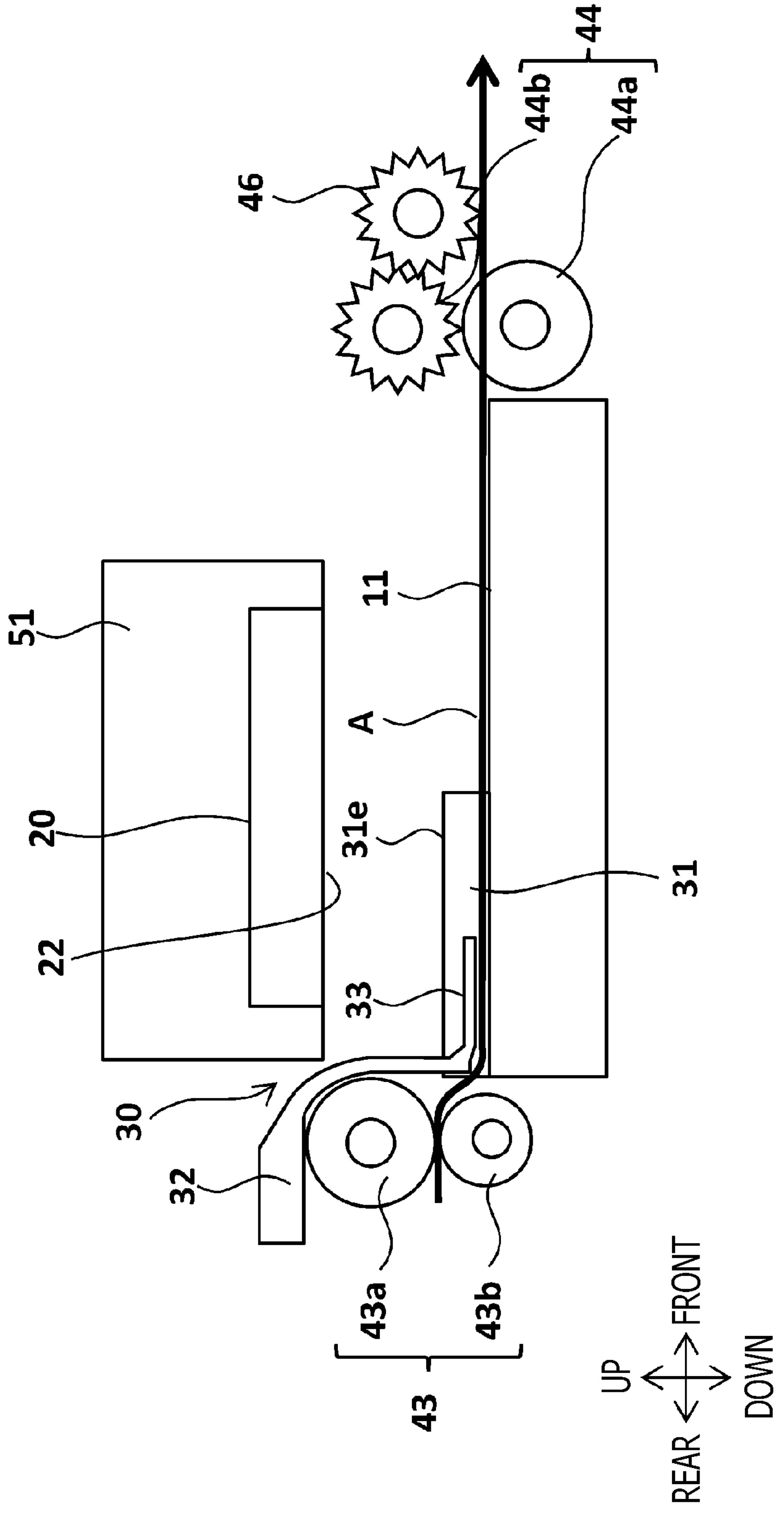
FIG. 4 is a sideward view of the corrugating member and the conveyer viewed at a position where the printing medium moves between a presser member and a platen.
Figure 5:
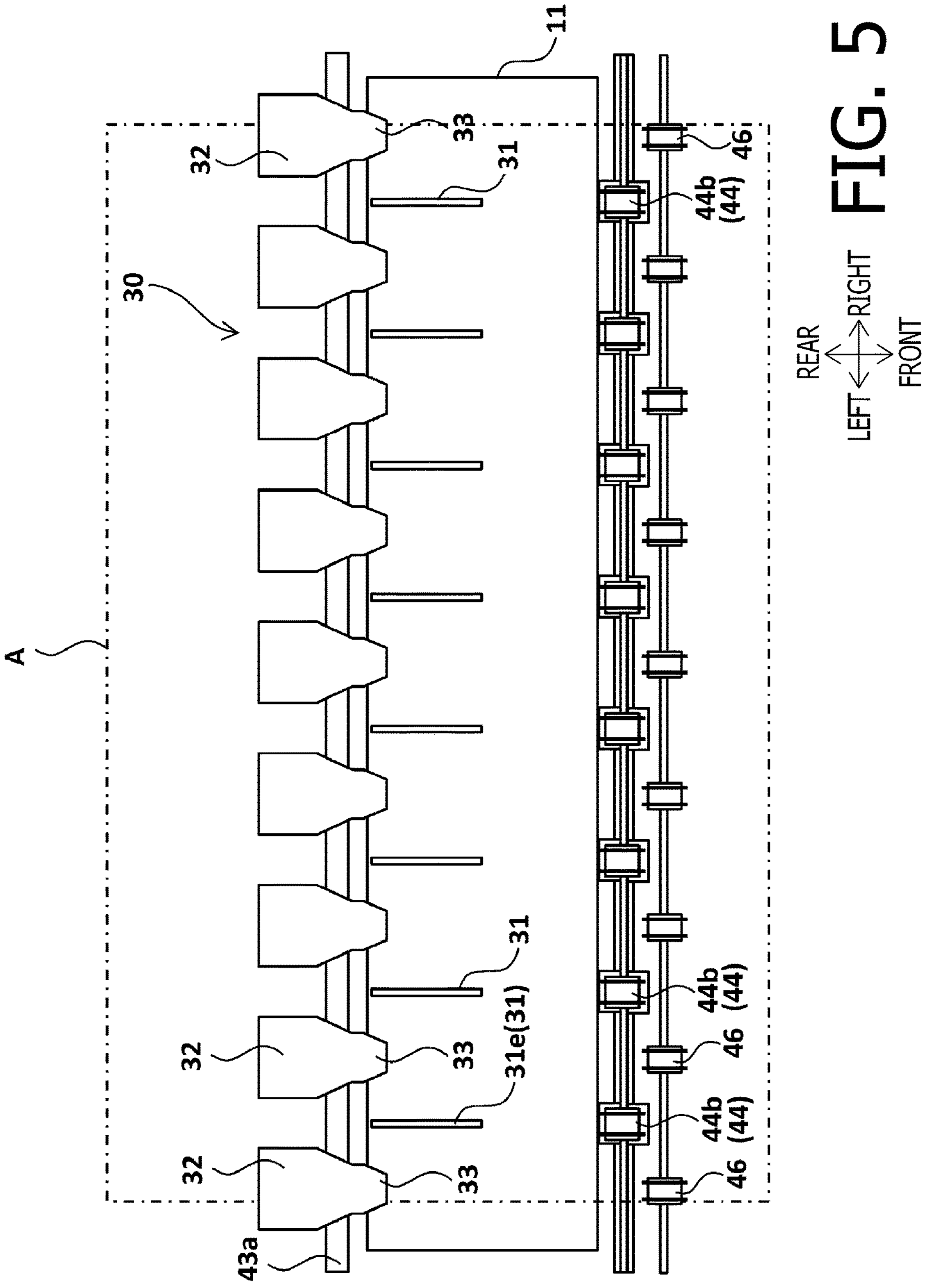
FIG. 5 is a top plan view of the corrugating member and a downstream roller in the printing apparatus.
Figure 6A:
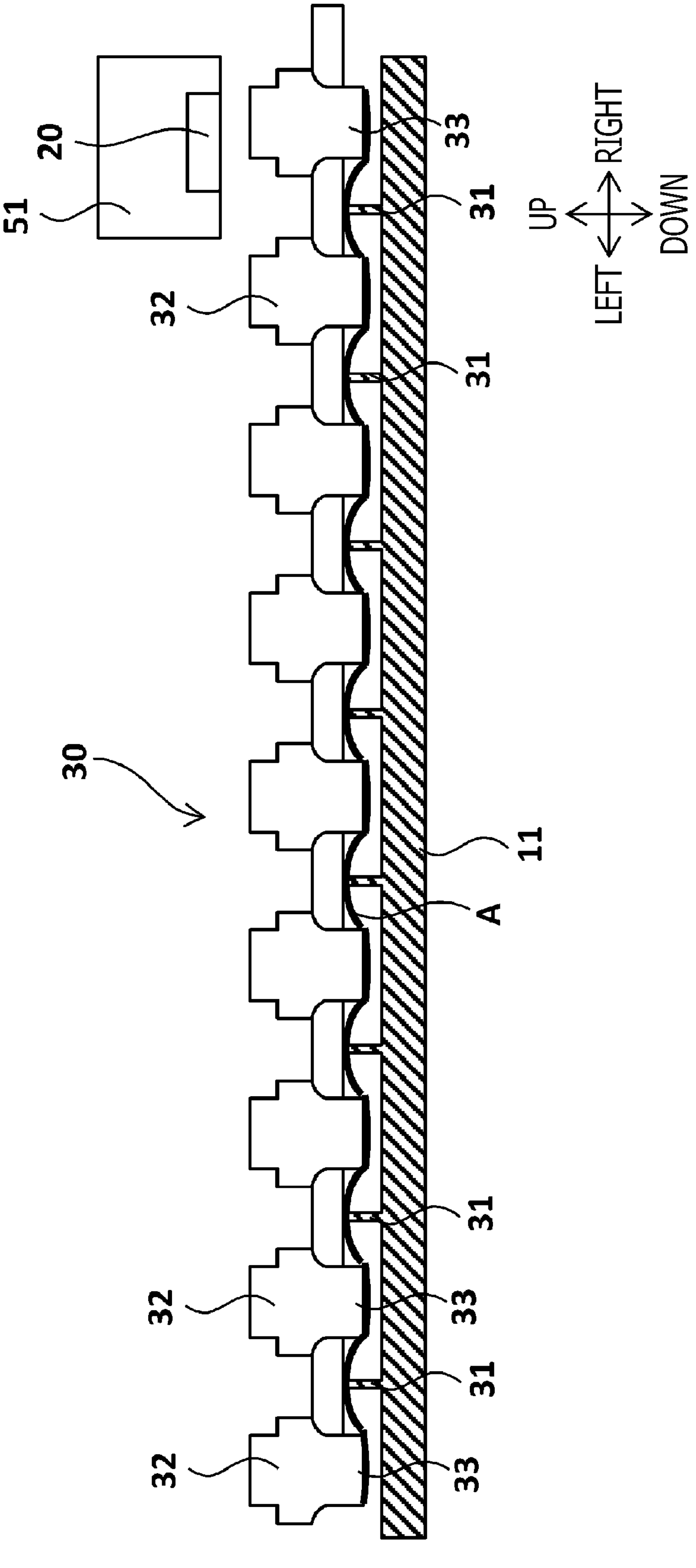
FIG. 6A is a frontward view of the corrugating member and the platen in the printing apparatus.
Figure 6B:
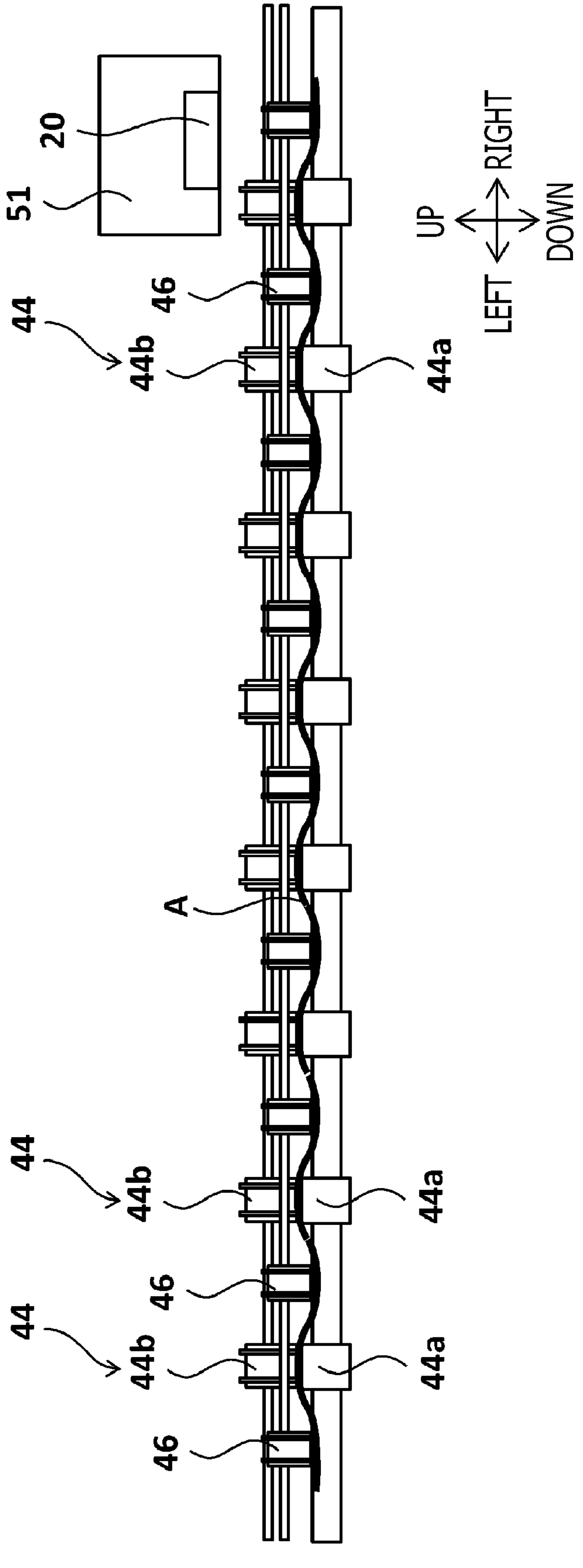
FIG. 6B is a frontward view of downstream rollers and spurs in the printing apparatus.

The printing apparatus 10 according to the embodiment of the present disclosure is an inkjet printer, as shown in FIGS. 1 and 2, that may print an image on a printing medium A in ink discharged from a head 20. The printing apparatus 10 is a serial-head styled printer having the head 20, a platen 11, a feeder tray 12, an ejection tray 13, a corrugating member 30, a conveyer 40, a scanner 50, a cutter 60, and a controller 70.

In the description below, a first direction, in which the printing medium A is conveyed by the conveyer 40 on the platen 11, will be called "frontward," and a direction opposite to the first direction will be called "rearward." A direction parallel to the first direction may be called "front-rear direction." A second direction intersects with the first direction. Along the second direction, the head 20 and the platen 11 align. An orientation from the platen 11 toward the head 20 along the second direction will be called "upward," and an orientation opposite to the upward orientation will be called "downward." A direction parallel to the second direction may be called "vertical direction." A third direction intersects with the first direction and the second direction. A direction parallel to the third direction may be called "widthwise direction." However, orientation of the printing apparatus 1 may not necessarily be limited to the orientation as mentioned herein.

The head 20 has a plurality of nozzles 21, a discharging surface 22, and a plurality of driving elements 23. The plurality of nozzles 21 are formed through the discharging surface 22. The nozzles 21 align in lines and are spaced from one another in the front-rear direction. The driving elements 23 may be, for example, piezoelectric devices. The driving elements 23 and the nozzles 21 are arranged on a one-on-on basis to apply discharging pressure to the ink in each of the nozzles 21. The ink may be discharged through the nozzles 21 by the pressure from the driving elements 23 and land on a printable surface of the printing medium A, which is placed to face the discharging surface 22. The ink may form dots to compose an image on the printing medium A. Thereby, the image composed of the dots may be printed on the printing medium A.

The scanner 50 includes a carriage 51, a scanner rail 52, a circular belt 53*a*, and a scanner motor 53. The scanner rail 52 extends in the widthwise direction. The carriage 51 has the head 20 mounted thereon and is supported by the scanner rail 52 movably in the widthwise direction along the scanner rail 52. The circular belt 53*a* longitudinally extends in the widthwise direction along the scanner rail 52. The circular belt 53*a* is attached to the carriage 51 and coupled to the scanner motor 53 through a pulley 53*b*. A driving force from the scanner motor 53 may be transmitted to the circular belt 53*a* through the pulley 53*b*, and through the circular belt 53*a*, the carriage 51 may move along the scanner rail 52. Thereby, the ink may be discharged from the head 20 through the discharging surface 22 at the printing medium A while the head 20 moves along the scanner rail 52, and the dots may be formed in the ink along the widthwise direction.

The platen 11 is located at a position lower than the head 20 and has an upper surface that faces the discharging surface 22 in the vertical direction. The platen 11 supports the printing medium A located on the upper surface thereof and defines a distance between the printing medium A and the discharging surface 22 in the vertical direction. The feeder tray 12 is located at a position lower than the platen 11, and the printing medium A may be placed on an upper surface of the feeder tray 12. The printing medium A is an elongated sheet made of, for example, paper or fabric, and is rolled around a core 14 axially extending in the widthwise direction to form a roll R. The printing medium A may be unrolled from the roll R and is located on the feeder tray 12 in an orientation such that a printable surface thereof faces the upper surface of the feeder tray 12.

The conveyer 40 may have, for example, a feeder roller 41, a guide 42, an upstream roller 43, a downstream roller 44, and an ejection roller 45. The feeder roller 41 is located at a position lower than the platen 11, higher than the feeder tray 12, and rearward with respect to the roll R. The feeder roller 41 extends axially in the widthwise direction and is provided with a feeder motor 41*a* thereon. The feeder roller 41 is rotatable by the feeder motor 41*a* on an axis thereof. The feeder roller 41 may rotate on the printing medium A unrolled rearward from the roll R and spreading on the feeder tray 12 to convey the printing medium A rearward. The guide 42 is located at a position higher than the feeder roller 41, substantially lower than the upstream roller 43, and rearward with respect to the feeder roller 41 and the upstream roller 43. The guide 42 curves in a form of U, in which a frontward surface thereof is recessed rearward. The printing medium A conveyed by the feeder roller 41 may move along the frontward surface of the guide 42 upper-rearward and turn upper-frontward.

The upstream roller 43 is located at a position higher than the feeder roller 41 and rearward with respect to the platen 11. The upstream roller 43 includes an upstream driving roller 43*a* and an upstream driven roller 43*b*. The upstream driving roller 43*a* and the upstream driven roller 43*b* extend axially in the widthwise direction and align in the vertical direction so that the printing medium A may be nipped between the upstream driving roller 43*a* and the upstream driven roller 43*b*. The upstream driving roller 43*a* is provided with an upstream motor 43*c* thereon and may be rotated by the upstream motor 43*c* on an axis thereof. The upstream driven roller 43*b* may nip the printing medium A in cooperation with the upstream driving roller 43*a* and, through the contact with the printing medium A, the upstream driven roller 43*b* may rotate on an axis thereof in conjunction with the rotation of the upstream driving roller 43*a*. Accordingly, the printing medium A may be conveyed frontward by the upstream roller 43 and move frontward on the platen 11 through a position between the head 20 and the platen 11, which are located frontward with respect to the upstream roller 43.

The downstream roller 44 is located at a position higher than the feeder roller 41 and frontward with respect to the platen 11. The downstream roller 44 includes a downstream driving roller 44*a* and a downstream driven roller 44*b*. The downstream driving roller 44*a* and the downstream driven roller 44*b* extend axially in the widthwise direction and align in the vertical direction so that the printing medium A may be nipped between the downstream driving roller 44*a* and the downstream driven roller 44*b*. The downstream driving roller 44*a* is provided with a downstream motor 44*c* thereon and may be rotated by the downstream motor 44*c* on an axis thereof. The downstream driven roller 44*b* may nip the printing medium A in cooperation with the downstream driving roller 44*a* and, through the contact with the printing medium A, the downstream driven roller 44*b* may rotate on an axis thereof in conjunction with the rotation of the downstream driving roller 44*a*. Accordingly, the printing medium A may be conveyed frontward by the downstream roller 44 and move frontward from the platen 11, which is located rearward with respect to the downstream roller 44.

The ejection roller 45 is located at a position higher than the feeder roller 41 and frontward with respect to the downstream roller 44. The ejection roller 45 includes an ejection driving roller 45*a* and an ejection driven roller 45*b*. The ejection driving roller 45*a* and the ejection driven roller 45*b* extend axially in the widthwise direction and align in the vertical direction so that the printing medium A may be nipped between the ejection driving roller 45*a* and the ejection driven roller 45*b*. The ejection driving roller 45*a* is provided with an ejection motor 45*c* thereon and may be rotated by the ejection motor 45*c* on an axis thereof. The ejection driven roller 45*b* may nip the printing medium A in cooperation with the ejection driving roller 45*a* and, through the contact with the printing medium A, the ejection driven roller 45*b* may rotate on an axis thereof in conjunction with the rotation of the ejection driving roller 45*a*. Accordingly, the printing medium A may be conveyed frontward by the ejection roller 45 and move to the cutter 60, which is located frontward with respect to the ejection roller 45.

The cutter 60 is located at a position frontward with respect to the ejection roller 45. The cutter 60 includes a blade 61, a holder 62, a cutter rail 63, a circular belt 64*a*, and a cutter motor 64. The cutter rail 63 extends in the widthwise direction at a position higher than the printing medium A conveyed by the ejection roller 45. The holder 62 retains the blade 61 and is supported by the cutter rail 63 movably in the widthwise direction along the cutter rail 63. The circular belt 64*a* longitudinally extends in the widthwise direction along the cutter rail 63. The circular belt 64*a* is attached to the holder 62 and is coupled to the cutter motor 64 through a pulley 64*b*. A driving force from the cutter motor 64 may be transmitted to the circular belt 64*a* through the pulley 64*b*, and through the circular belt 64*a*, the holder 62 may move along the cutter rail 63. Thereby, the printing medium A conveyed by the ejection roller 45 may be cut by the blade 61 moving along the cutter rail 63. The printing medium A cut by the cutter 60 may be ejected outside at the ejection tray 13, which is located frontward with respect to the cutter 60.

The printing medium A may be cut by the cutter 60 at a position rearward with respect to a rear end of a printed image to be included in a single piece of the printing medium A. Once the printing medium A is cut, the printing medium A having been cut off may have a printed area, in which the image is printed, and an unprinted blank area, in which no image is printed, located frontward with respect to the printed area. In this regard, optionally, the printing medium A cut at the position rearward with respect to the rear end of the image may further be cut at a position between the printed area and the blank area. Moreover, while the part of the printing medium A containing the printed area is ejected at the ejection tray 13, the part of the printing medium A containing the blank area may be ejected at another feeder tray, which is different from the feeder tray 12. Furthermore, the part of the printing medium A contained the blank area may be fed from the another feeder tray to the position on the platen 11 again by the conveyer 40. For another example, the blade 61 may either be a plain rectangular blade or a disc-formed rotary blade. In the case where the blade 61 is a rotary blade, a rotary motor may be provided to the cutter 60 in an arrangement such that the blade 61 is rotatable on a shaft of the rotary motor, and activation of the rotary motor is controlled by the controller 70.

The controller 70 is a computer including circuits such as a CPU and is electrically connected with the driving elements 23 in the head 20, the scanner motor 53 in the scanner 50, the feeder motor 41*a*, the upstream motor 43*c*, the downstream motor 44*c*, the ejection motor 45*c*, and the cutter motor 64 in the cutter 60 in the conveyer 40 to control acts of these devices. The controller 70 may conduct a printing process, in which an image is printed on the printing medium A. In particular, in the printing process, the controller 70 may conduct a pass action, in which the head 20 is moved rightward or leftward and the ink is discharged from the head 20, and a conveying action, in which the printing medium A is conveyed, alternately and repeatedly. Further, the controller 70 may conduct a cutting process, in which the printing medium A with the image printed thereon is cut.

<Corrugating Member>

As shown in FIGS. 3-6, the platen 11 supports the printing medium A unrolled from the roll R. The corrugating member 30 includes a plurality of ribs 31, which are spaced from one another in the widthwise direction and protrude from the platen 11 in the vertical direction, and a plurality of presser members 32, which may press the printing medium A toward the platen 11 at intervening positions between the ribs 31 adjoining in the widthwise direction. In this arrangement, the corrugating member 30 may corrugate the printing medium A. The conveyer 40 has spurs 46 at a position frontward with respect to the platen 11.

For example, the platen 11 may be in a form of a flat plate and may be longer in the widthwise direction than the printing medium A. An upper surface of the platen 11 is substantially flat and faces the discharging surface 22 of the head 20. The upper surface of the platen 11 is located at a position lower than a nipping position, at which the upstream driving roller 43*a* and the upstream driven roller 43*b* in the upstream roller 43 nip the printing medium A, and lower than a nipping position, at which the downstream driving roller 44*a* and the downstream driven roller 44*b* in the downstream roller 44 nip the printing medium A.

The ribs 31 are plate-formed pieces, each of which is elongated in the front-rear direction and thin in the widthwise direction. Lower ends of the ribs 31 are continuous to the upper surface of the platen 11, and upper ends 31*e* of the ribs 31 face the discharging surface 22. The ribs 31 are shorter in the front-rear direction than the platen 11 in the front-rear direction and are located closer to a rearward end of the platen 11 than to a frontward end of the platen 11. The ribs 31 are equally spaced in the widthwise direction and overlap one another in a view along the widthwise direction. When, for example, the ribs 31 are in an identical shape and size, rearward ends of the ribs 31 may be located at a same position in the front-rear direction, and frontward ends of the ribs 31 may be located at a same position in the front-rear direction. The upper ends 31*e* of the ribs 31 are located at a position, which is the same as or slightly lower than the nipping position in the upstream roller 43 and the same as or slightly higher than the nipping position in the downstream roller 44.

The presser members 32 are fixed to, for example, the scanner rail 52 (see FIG. 1), at rear ends thereof in a position rearward with respect to the upstream roller 43. The presser members 32 extend frontward from the rear ends thereof at a position above the upstream roller 43, extend downward at a position frontward with respect to the upstream roller 43, and further extend frontward at a position above the platen 11. The part of each presser member 32 that extend frontward at the position frontward with respect to the upstream roller 43 works as a presser portion 33 that presses the printing medium A toward the platen 11. The presser portions 33 are spaced at intervals that are equal to the intervals between the adjoining ribs 31 and overlap the ribs 31 in the view along the widthwise direction. The presser portions 33 are shorter than the ribs 31 in the front-rear direction, and front ends of the presser portions 33 are located rearward with respect to the front ends of the ribs 31. The presser portions 33 are located at a position, which is lower than the nipping position in the upstream roller 43 and the nipping position in the downstream roller 44, in the vertical direction. The presser portions 33 are located at a position higher than the upper surface of the platen 11 and lower than the upper ends 31*e* of the ribs 31.

In the corrugating member 30 described above, the ribs 31 and the presser portions 33 are arranged alternately in the widthwise direction. With the corrugating member 30, the printing medium A is deformed to have mountains, which are raised by the ribs 31 to be higher than the presser portions 33, and valleys, which are pressed by the presser portions 33 to be lower than the upper ends 31*e* of the ribs 31. Thereby, the printing medium A may be placed in a corrugated form, in which the mountains and the valleys are arranged alternately in the widthwise direction.

The downstream roller 44 includes a plurality of pieces of downstream roller 44, which are equally spaced in the widthwise direction. A number of the pieces of the downstream roller 44 is equal to a number of the ribs 31. The pieces of the downstream roller 44 are located frontward with respect to the platen 11. The pieces of the downstream roller 44 are located at the same position as the ribs 31 in the widthwise direction to overlap the ribs 31 in a view along the front-rear direction. The nipping position in the downstream roller 44 is located to be higher than the presser portions 33 in the vertical direction and at a position the same or slightly lower than the upper ends 31*e* of the ribs 31. Therefore, the printing medium A being nipped between the downstream driving roller 44*a* and the downstream driven roller 44*b* in the downstream roller 44 may be conveyed frontward while the forms of the mountains raised by the ribs 31 are maintained.

The spurs 46 are located frontward with respect to the downstream roller 44 and are equally spaced in the widthwise direction. The spurs 46 are located at the same position as the presser portions 33 in the widthwise direction to overlap the presser portions 33 in a view along the front-rear direction. The spurs 46 are arranged between the pieces of the downstream roller 44 adjoining in the widthwise direction. Lower ends of the spurs 46 are located at a position, which is lower than the nipping position in the downstream roller 44 and the upper ends 31*e* of the ribs 31 and is the same as or slightly lower than the presser portions 33 in the vertical direction. In this arrangement, the valleys in the printing medium A being pressed downward by the presser portions 33 are pressed downward by the spurs 46. Therefore, the printing medium A may be conveyed frontward with the forms of the valleys being maintained. Thereby, the printing medium A may be placed in the corrugated form, in which the mountains and the valleys are arranged alternately in the widthwise direction.

<Printing Control>

Next, printing control in the printing apparatus 10 will be described below. In the printing apparatus 10, the printing medium A is held and supported by both of the upstream roller 43 and the downstream roller 44 at all time; therefore, an image may be printed on the printing medium A in a multi-pass printing method. In the multi-pass printing method, the controller 70 divides image data composing an image to be printed on the printing medium A into a plurality of sets, each of which composes a part of the image. Each set of image data is assigned to a plurality of passes, e.g., three passes, and the part of the image is printed in three passes based on the set of image data. For example, dots formed in the ink discharged in a first pass from the head 20, dots formed in the ink discharged in a second pass from the head 20, and dots formed in the ink discharged in a third pass from the head 20 are layered on the printing medium A to complete the part of the image. When all of the parts of the image are printed, the whole image is completed on the printing medium A. When printing the parts of the image, due to unevenness or irregularity in conveyance of the printing medium A, some of the parts may be separated from adjoining parts of the image, or some of the parts may overlap adjoining parts of the image. Such displacement of the parts of the image may cause unevenness in density. In order to reduce the density unevenness, a nozzle usage rate to use the nozzles 21 of the head 20 may be adjusted for each pass. The nozzle usage rate is a rate of the nozzles 21 to be used for printing the image among the entire nozzles 21 in the head 20.

Figure 7:
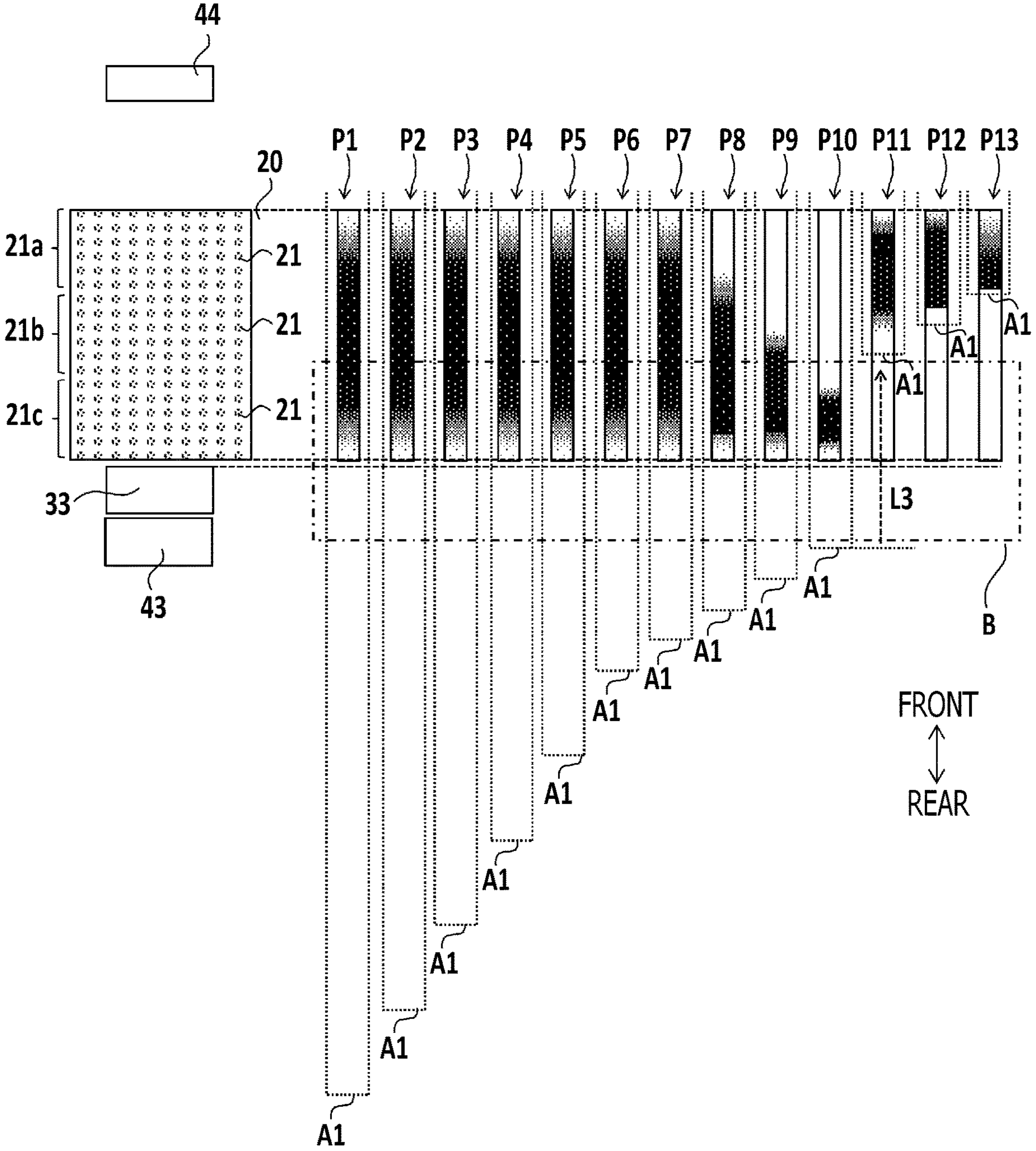
FIG. 7 illustrates positional relation between a rear end of the printing medium and a restrictive zone in each pass.
Figure 8:
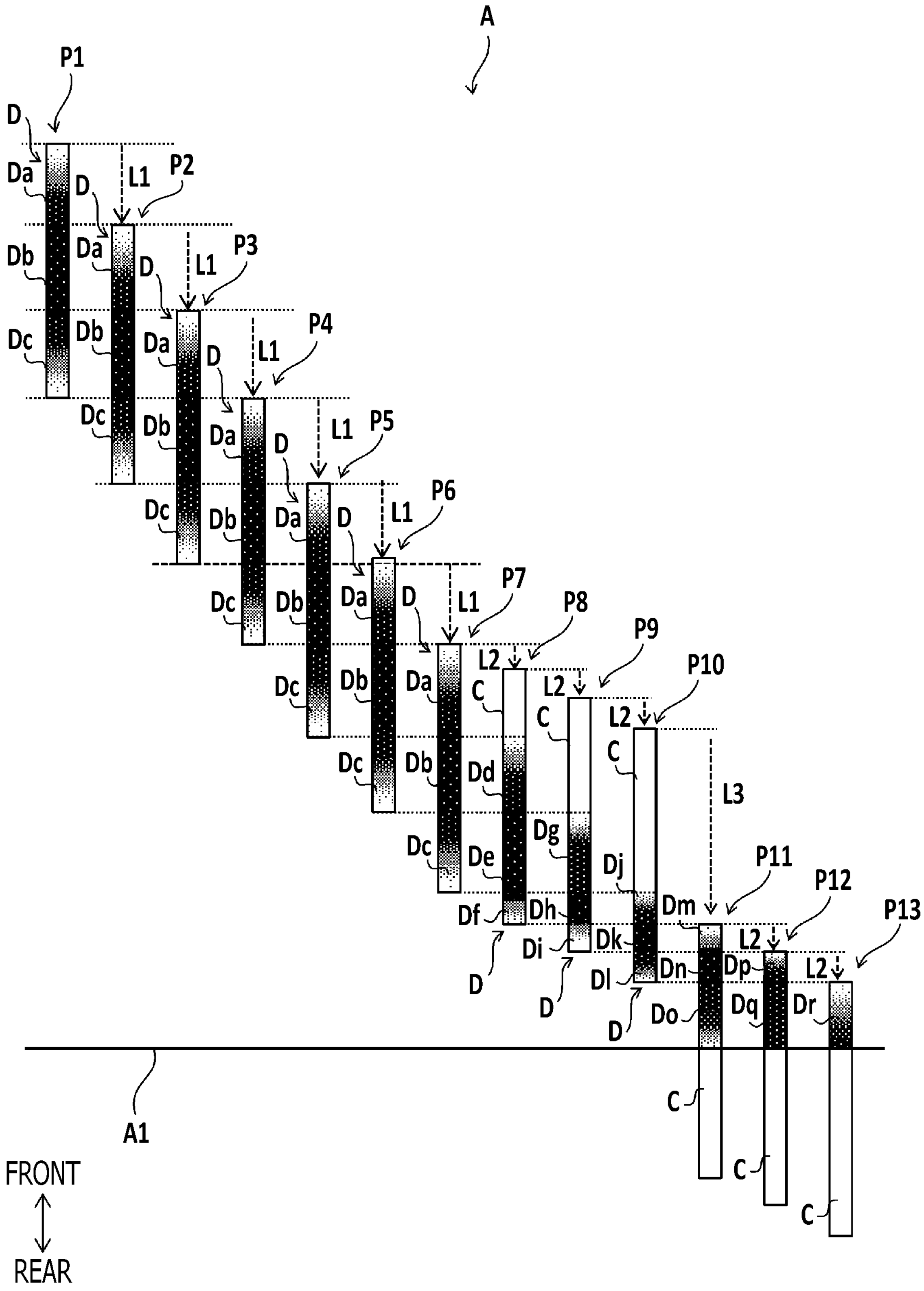
FIG. 8 illustrates a nozzle usage rate and a distance to convey the printing medium in each pass.

For example, as shown in FIG. 8, the image may be printed in passes P1-P13. Among these passes P1-P13, in the passes P1-P7, the printing medium A may be conveyed forward by a distance L1 each time. For the passes P1-P7, as shown in FIG. 7, the nozzles 21 may be divided along the front-rear direction into, for example, three groups: a front nozzle group 21*a*, a middle nozzle group 21*b*, and a rear nozzle group 21*c*. The front nozzle group 21*a*, the middle nozzle group 21*b*, and the rear nozzle group 21*c* align along the front-rear direction in this given order from front to rear, and each nozzle group contains a plurality of nozzles 21. The nozzle usage rate for the middle nozzle group 21*b* is higher than the front nozzle group 21*a* and the rear nozzle group 21*c*. Within the front nozzle group 21*a*, the nozzle usage rate is lower toward the front, and within the rear nozzle group 21*c*, the nozzle usage rate is lower toward the rear. Therefore, the nozzle usage rate forms a gradation, in which the nozzle usage rate is higher in the middle nozzle group 21*b* and decreases toward the front and the rear so that the density of the nozzles 21 to be used is lower as the nozzles 21 are farther from the middle nozzle group 21*b*. Optionally, the front nozzle group 21*a*, the middle nozzle group 21*b*, and the rear nozzle group 21*c* may be arranged in the head 20 such that some of the nozzles 21 located frontward with respect to the front nozzle group 21*a* and some of the nozzles 21 located rearward with respect to the rear nozzle group 21*c* are designated as unused nozzles 21.

As shown in FIG. 8, in the passes P1-P2 in the printing process, the controller 70 operates the head 20 to move rightward or leftward and discharge the ink from the head 20 according to the gradually shifting nozzle usage rate to form dots D on the printing medium A. After forming the dots in each pass, the controller 70 operates the conveyer 40 to convey the printing medium A frontward by the distance L1. The controller 70 repeats the pass and the conveying operation. The distance L1 is equal to a length of the front nozzle group 21*a* in the front-rear direction. Therefore, dots Dc formed by the rear nozzle group 21*c* in a pass, e.g., the pass P1, dots Db formed by the middle nozzle group 21*b* in a next pass, e.g., the pass P2, and dots Da formed by the front nozzle group 21*a* in a second next pass, e.g., the pass P3, overlap on the printing medium A to form a part of the image. In this arrangement, the part of the image in the same range on the printing medium A may be printed in a plurality of passes, e.g., three passes. A number of the dots Da, a number of the dots Db, and a number of the dots Dc in this range are equal to a number of dots that compose the part of the image. Thus, each part of the image may be completed in three passes.

<Benefits>

As described above, the printing medium A unrolled from the roll R tends to curl more easily compared to cut-loose sheets. In this regard, the printing medium A is corrugated by the corrugating member 30, and with the corrugation, the printing medium A may be restrained from curling. Therefore, the printing medium A may be restrained from contacting the head 20 and may be restrained from being smeared with the ink from the head 20 while the image is being printed by the head 20.

Moreover, the cutter 60 is located frontward with respect to the downstream roller 44. Therefore, the printing medium A may be conveyed on the platen 11, which is located between the upstream roller 43 and the downstream roller 44, while the image is being printed by the head 20 thereon, and thereafter, the printing medium A may be cut by the cutter 60 located frontward with respect to the downstream roller 44. In this arrangement, even after a part of the printing medium A is cut off by the cutter 60, the printing medium A continues to be held and supported by both the upstream roller and the downstream roller 44 in the range between the platen 11 head 20. Therefore, the printing medium A may be restrained from contacting the head 20 and may be restrained from being smeared with the ink from the head 20 when a next image is printed by the head 20.

According to the present embodiment, the cutter 60 is located frontward with respect to the downstream roller 44. In contrast, for example, in a comparative case where the cutter 60 is located rearward with respect to the upstream roller 43, there may be a risk that the printing medium A released from the upstream roller 43 contacts the head 20 and may be smeared with the ink in the head 20. Moreover, there may be a risk that dust or fragments caused by the cutting action from the printing medium A adhere to the discharging surface 22 of the head 20 to cover the nozzles 21 formed through the discharging surface 22. In such cases, problems such that the ink discharged from the nozzles 21 is directed at incorrect directions or restrained from being discharged correctly may occur.

The problems in the comparative case may due to three main causes. First, the printing medium A cut by the cutter 60 has a rear end A1 (see FIG. 7) located at, for example, between the upstream roller 43 and the downstream roller 44. In this arrangement, the printing medium A is supported solely by the downstream roller 44, and the head 20 located between the upstream roller 43 and the downstream roller 44 may be touched by the printing medium A easily. Second, the ribs 31 for corrugating the printing medium A may be a cause. With the ribs 31 that raise the printing medium A, the printing medium A may tend to approach the discharging surface 22 of the head 20 and contact the head 20. Third, the printing medium A having been rolled around the core 14 in the roll R tends to curl. The curled printing medium A may approach the head 20 to contact the head 20 easily compared to cut-loose sheets.

Thus, the printing medium A may be supported by the downstream roller 44 alone, raised by the ribs 31, and curled. Therefore, the printing medium A may contact the head 20 easily and may cause the problems such as smears on the printing medium A and/or incorrect discharging behavior of the head 20. In order to restrain the printing medium A from contacting the head 20, a restrictive zone B may be provided. The restrictive zone B is a zone, in which, once the rear end A1 of the printing medium A being conveyed enters, the head 20 may print the image on the printing medium A in a condition that the rear end A1 of the printing medium A is raised by the ribs 31 while the printing medium is supported not by the both upstream roller 43 and the downstream roller 44 but by the downstream roller 44 alone.

Regarding the comparative example, first, an occasion where the problem should not occur, in other words, an occasion where the rear end A1 of the printing medium A is not in the restrictive zone B, will be described. In this occasion, a part of the printing medium A having the rear end A1 may be supported by the downstream roller 44 alone. In this position, the printing medium A may not be supported stably, and the unstableness may affect undesirably to quality of the image. Therefore, in order to reduce an area of the image that may be affected undesirably by the unstableness of the printing medium A, for printing the image on the printing medium A in this position, a number of nozzles 21 to be used among the entire nozzles 21 in the head 20 may be reduced.

Moreover, between the pass P7 and the pass P8, the controller 70 may operate the conveyer 40 to convey the printing medium A by a distance L2, which is shorter than the distance L1. In the pass P8, the controller 70 may suspend the head 20 from using the nozzles 21 corresponding to an area C, which overlaps the dots Da formed in the pass P7. Moreover, for the nozzle group corresponding to the dots Dd, which overlap the dots Db formed in the pass P7, the controller 70 may set the nozzle usage rate to be lower toward the front. Meanwhile, for the nozzle group corresponding to dots De, which overlap the dots Dc formed in the pass P7, the controller 70 may set the nozzle usage rate to be equal to the nozzle usage rate for the middle nozzle group 21*b*. For the nozzle group corresponding to dots Df, which are formed rearward with respect to the dots De in the pass P8, the controller 70 may set the nozzle usage rate to be lower toward the rear.

After the pass P8, the controller 70 may operate the conveyer 40 to convey the printing medium A by the distance L2 and conducts the pass P9. In the pass P9, the controller 70 may suspend the head 20 from using the nozzles 21 corresponding to an area C, which overlaps the dots Dd formed in the pass P8. Moreover, for the nozzle group corresponding to dots Dg, which overlap the dots De formed in the pass P8, the controller 70 may set the nozzle usage rate to be lower toward the front. Meanwhile, for the nozzle group corresponding to dots Dh, which overlap the dots Df formed in the pass P8, the controller 70 may set the nozzle usage rate to be equal to the nozzle usage rate for the middle nozzle group 21*b*. For the nozzle group corresponding to dots Di, which are formed rearward with respect to the dots Dh in the pass P9, the controller 70 may set the nozzle usage rate to be lower toward the rear.

After the pass P9, the controller 70 may operate the conveyer 40 to convey the printing medium A by the distance L2 and conducts the pass P10. In the pass P10, the controller 70 may suspend the head 20 from using the nozzles 21 corresponding to an area C, which overlaps the dots Dg formed in the pass P9. Moreover, for the nozzle group corresponding to dots Dj, which overlap the dots Dh formed in the pass P9, the controller 70 may set the nozzle usage rate to be lower toward the front. Meanwhile, for the nozzle group corresponding to dots Dk, which overlap the dots Di formed in the pass P9, the controller 70 may set the nozzle usage rate to be equal to the nozzle usage rate for the middle nozzle group 21*b*. For the nozzle group corresponding to dots Dl, which are formed rearward with respect to the dots Dk in the pass P10, the controller 70 may set the nozzle usage rate to be lower toward the rear. By the time when the pass P10 is conducted, as shown in FIG. 7, the rear end A1 of the printing medium A is not in the restrictive zone B but stays outside the restrictive zone B.

After the pass P10, the controller 70 may operate the conveyer 40 to convey the printing medium A by a distance L3, which is longer than the distance L2, and conducts the pass P11. In the pass P11, for the nozzle group corresponding to dots Dm, which overlap the dots Dk formed in the pass P10, the controller 70 may set the nozzle usage rate to be lower toward the front. Meanwhile, for the nozzle group corresponding to dots Dn, which overlap the dots Dl formed in the pass P10, the controller 70 may set the nozzle usage rate to be equal to the nozzle usage rate for the middle nozzle group 21*b*. For the nozzle group corresponding to dots Do, which are formed rearward with respect to the dots Dn in the pass P11, the controller 70 may set the nozzle usage rate to be lower toward the rear. For the nozzles 21 corresponding to an area C located rearward with respect to the dots Do formed in P11, the controller 70 may suspend the head 20 from using the nozzles 21.

After the pass P11, the controller 70 may operate the conveyer 40 to convey the printing medium A by the distance L2 and conduct the pass P12. In the pass P12, for the nozzle group corresponding to dots Dp, which overlap the dots Dn formed in the pass P11, the controller 70 may set the nozzle usage rate to be lower toward the front. Meanwhile, for the nozzle group corresponding to dots Dq, which overlap the dots Do formed in the pass P11, the controller 70 may set the nozzle usage rate to be equal to the nozzle usage rate for the middle nozzle group 21*b*. For the nozzles 21 corresponding to an area C located rearward with respect to the dots Dq formed in P12, the controller 70 may suspend the head 20 from using the nozzles 21.

After the pass P12, the controller 70 may operate the conveyer 40 to convey the printing medium A by the distance L2 and conduct the pass P13. In the pass P13, for the nozzle group corresponding to dots Dr, which overlap the dots Dq formed in the pass P12, the controller 70 may set the nozzle usage rate to be lower toward the front. For the nozzles 21 corresponding to an area C located rearward with respect to the dots Dr formed in P13, the controller 70 may suspend the head 20 from using the nozzles 21. In this arrangement, the dots D formed in three passes may overlap one another, and the image may be printed on the printing medium A. Thus, as shown in FIG. 7, while the rear end A1 of the printing medium A is kept outside the restrictive zone B, the printing medium A may be restrained from contacting the head 20 and may be restrained from being smeared with the ink.

Next, regarding the comparative example, an occasion where the problem may occur, in other words, an occasion where the rear end A1 of the printing medium A enters the restrictive zone B, will be described. As described above, in order to restrain the rear end A1 of the printing medium A from entering the restrictive zone B, for the part of the printing medium A closer to the rear end A1, the controller 70 may control the conveyer 40 to convey the printing medium A in the predetermined format to convey by the distance L2 for three times and thereafter by the distance L3 once. However, while the printing medium A may be cut by the cutter 60 to a different length each time, the length of each cutoff printing medium A in the front-rear direction may be different. Therefore, in spite of the conveyance control as described above, in some occasions, the rear end A1 of the printing medium A may enter the restrictive zone B.

In such occasions, when the rear end A1 of the printing medium A is in the restrictive zone B, the controller 70 may operate the conveyer 40 to convey the printing medium A by the distance L3, which is longer than the distance L2. Thereby, the image may be printed on the printing medium A, which is supported by the ribs 31 at the rear end A1 and by the downstream roller 44 at the frontward position, and the ink may land on the rear end A1 of the printing medium A. In this arrangement, a distance between the printing medium A supported by the ribs 31 and the head 20 may be relatively short, and the rear end A1 of the printing medium A with the ink landed thereon may warp; therefore, the rear end A1 of the printing medium A may tend to approach the head 20.

In order to restrain the printing medium A from contacting the head 20, it may be considered that the printing medium A is conveyed by a distance L4, which is longer than the distance L3, in place of conveying the printing medium A by the distance L3, so that the rear end A1 may be closer to the downstream roller 44. However, when the printing medium A is conveyed by the distance L4, interlacing control may not be enabled, and the lack of the interlaced control may affect the imaging quality undesirably. Therefore, conveying the printing medium A by the distance L4 may not be adopted. In this regard, in order to enable the interlacing control, in the case for example where each part of the image is completed in three passes, a condition that a sum of the distance L2, the distance L2, and the distance L3 should not exceed the length between the most frontward nozzle 21 and the most rearward nozzle 21 in the head 20 needs to be satisfied. For another example, in a case where each part of the image is completed in two passes, a condition that a sum of the distance L2 and the distance L3 should not exceed the length between the most frontward nozzle 21 and the most rearward nozzle 21 in the head 20 needs to be satisfied.

In consideration of these problems and the conditions, in the present embodiment, the cutter 60 is located frontward with respect to the downstream roller 44, and the printing medium A is cut at the position frontward with respect to the downstream roller 44. According to this arrangement, the printing medium A is supported by both of the upstream roller 43 and the downstream roller 44. In other words, the printing medium A may be restrained from contacting the head 20, and the image may be printed on the printing medium A in the multi-pass printing method without causing the problems described above.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiment of the disclosure, as set forth above, is intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below.

First Modified Example

Figure 9:
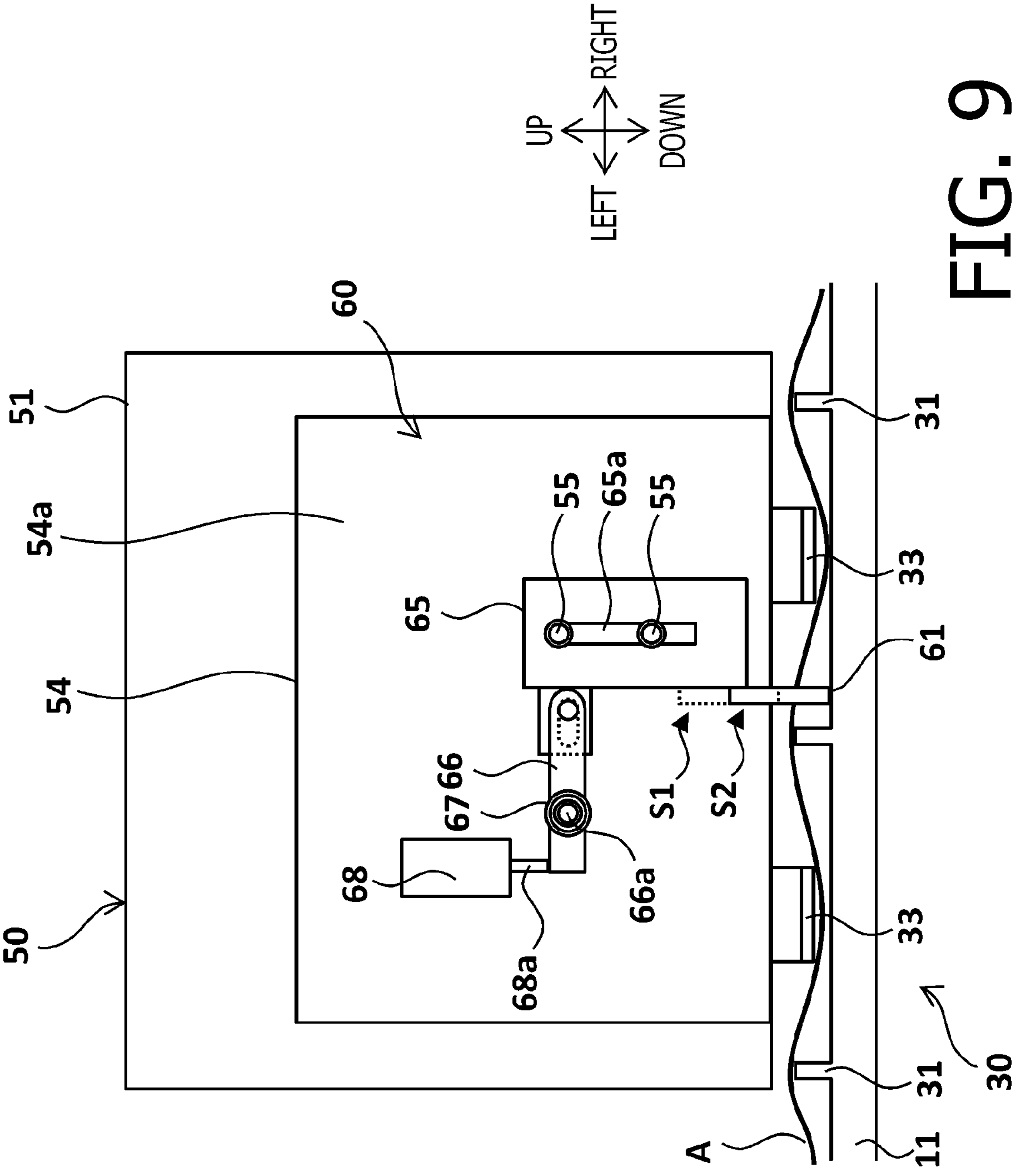
FIG. 9 is a frontward view of a carriage and a cutter in a printing apparatus.
Figure 10:
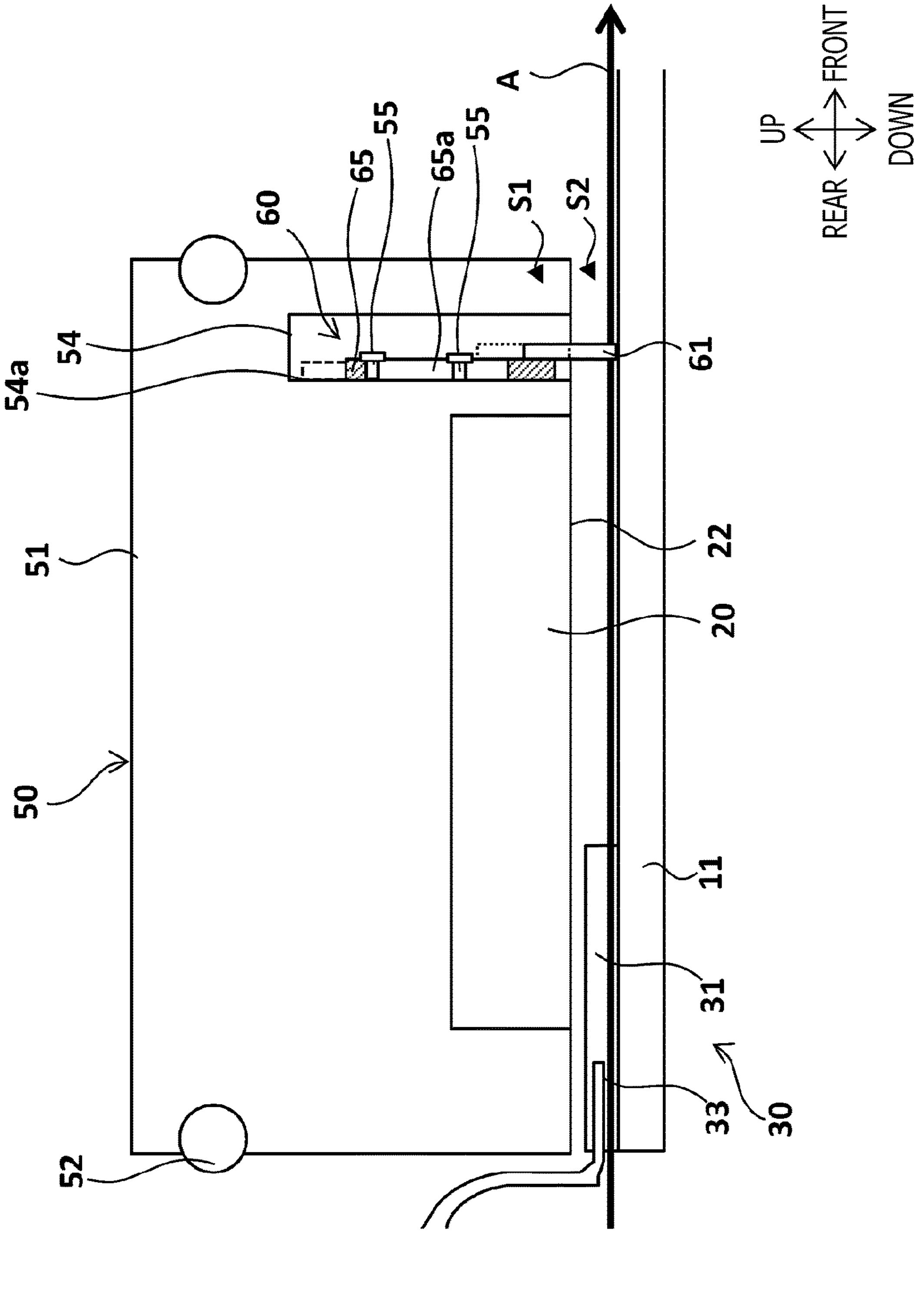
FIG. 10 is a sideward view of the carriage and the cutter in the printing apparatus shown in FIG. 9.

As shown in FIGS. 9-10, the printing apparatus 10 in a first modified example has a carriage 51, on which the head 20 is mounted, and the head 20 mounted on the carriage 51 may move in the widthwise direction. Moreover, the cutter 60 is mounted on the carriage 51. Optionally, the cutter 60 may be located frontward with respect to the head 20 and to the ribs 31.

The carriage 51 has a cavity 54, which is open downward, and the cutter 60 is stowed in the cavity 54. The cavity 54 and the cutter 60 are located frontward with respect to the head 20. On a frontward surface 54*a* being one of inner surfaces forming the cavity 54 in the carriage 51, two (2) first pins 55 are located. The first pins 55 are spaced in the vertical direction and protrude frontward from the frontward surface 54*a*.

The cutter 60 has an attachment board 65, and the blade 61 is attached to a lower end of the attachment board 65. A rearward surface of the attachment board 65 faces the frontward surface 54*a*. In the attachment board 65, a first elongated hole 65*a* is formed. The first elongated hole 65*a* is elongated in the vertical direction and is formed through the attachment board 65 in the front-rear direction. The attachment board 65 is attached to the carriage 51 with the first pins 55 being inserted in the elongated hole 65*a*. In this arrangement, the cutter 60 is attached to the carriage 51 movably in the vertical direction.

A lever 66, a spring 67, and a solenoid 68 are arranged on the carriage 51. The lever 66 is connected to the attachment board 65 at a rightward end thereof and to a movable portion 68*a* of the solenoid 68 at a leftward end thereof. The lever 66 has a rod 66*a* between the rightward end and the leftward end thereof. The rod 66*a* is connected to the frontward surface 54*a* to protrude frontward from the frontward surface 54*a*. The lever 66 is pivotable around the rod 66*a*. When the solenoid 68 is inactive, a force in a counterclockwise direction is applied to the lever 66, and the attachment board 65 may be uplifted. Therefore, the blade 61 may move to a retracted position S1, which is above the printing medium A, to be stowed in the cavity 54. On the other hand, when the solenoid 68 is active, the movable portion 68*a* of the solenoid 68 may move upward, and a force in a clockwise direction from the movable portion 68*a* may be applied to the lever 66, and the attachment board 65 may descend. Therefore, the blade 61 may move to be lower than the lower end of the carriage 51 to a cutting position S2 in the conveyer path. At the cutting position S2, the lower end of the blade 61 may be located at a position, in which the blade 61 may cut the printing medium A, above the platen 11.

In the printing process, while the blade 61 is at the retracted position S1, the printing medium A is corrugated by the corrugating member 30, and thereafter, an image is printed by the head 20 moving in the widthwise direction. As the conveyer 40 conveys the printing medium A and when a rear end of the printed image to be included in a single piece of the printing medium A reaches a position frontward with respect to the blade 61, the controller 70 may stop the conveyer 40, activate the solenoid 68, and move the carriage 51 in the widthwise direction. Thereby, the blade 61 may descend from the retracted position S1 to the cutting position S2 and move in the widthwise direction, and the printing medium A may be cut by the blade 61. Thereafter, the controller 70 may inactivate the solenoid 68, move the blade 61 from the cutting position S2 to the retracted position S1 to stow the blade 61 in the cavity 54. Further, the controller 70 may operate the conveyer 40 to convey the printing medium A to convey a rearward part of the printing medium A located rearward with respect to the cut position frontward by the upstream roller 43 and a frontward part of the printing medium A located frontward with respect to the cut position frontward by the downstream roller 4.

In this arrangement, the printing medium A being corrugated by the corrugating member 30 may be restrained from touching the head 20 while the head 20 prints the image on the printing medium A. Moreover, with the cutter 60 mounted on the carriage 51, a dedicated mechanism to move the cutter 60 in the widthwise direction may be omitted, and a number of parts to be manufactured may be reduced.

Moreover, the cutter 60 is located frontward with respect to the head 20. In this arrangement, when the printing medium A is cut by the cutter 60, the rear end A1 of the cutoff printing medium A and a new frontward end of the printing medium A continuous from the roll R are produced at the position frontward with respect to the head 20. Therefore, the printing medium A may be restrained from contacting the head 20. Moreover, with the cutter 60 being located frontward with respect to the ribs 31, both the rear end A1 of the cutoff printing medium A and the new frontward end of the printing medium A continuous from the roll R may be restrained by the ribs 31 from being raised, and the printing medium A may be restrained from contacting the head 20. Moreover, the cutter 60 is located frontward with respect to the head 20 and the ribs 31. Therefore, the printing medium A may be supported both by the upstream roller 43 and the downstream roller 44 while the image is being printed on the printing medium A, and the printing medium A may be restrained from contacting the head 20. Thus, the image may be printed on the printing medium A in the multi-pass printing method.

Second Modified Example

Figure 11:
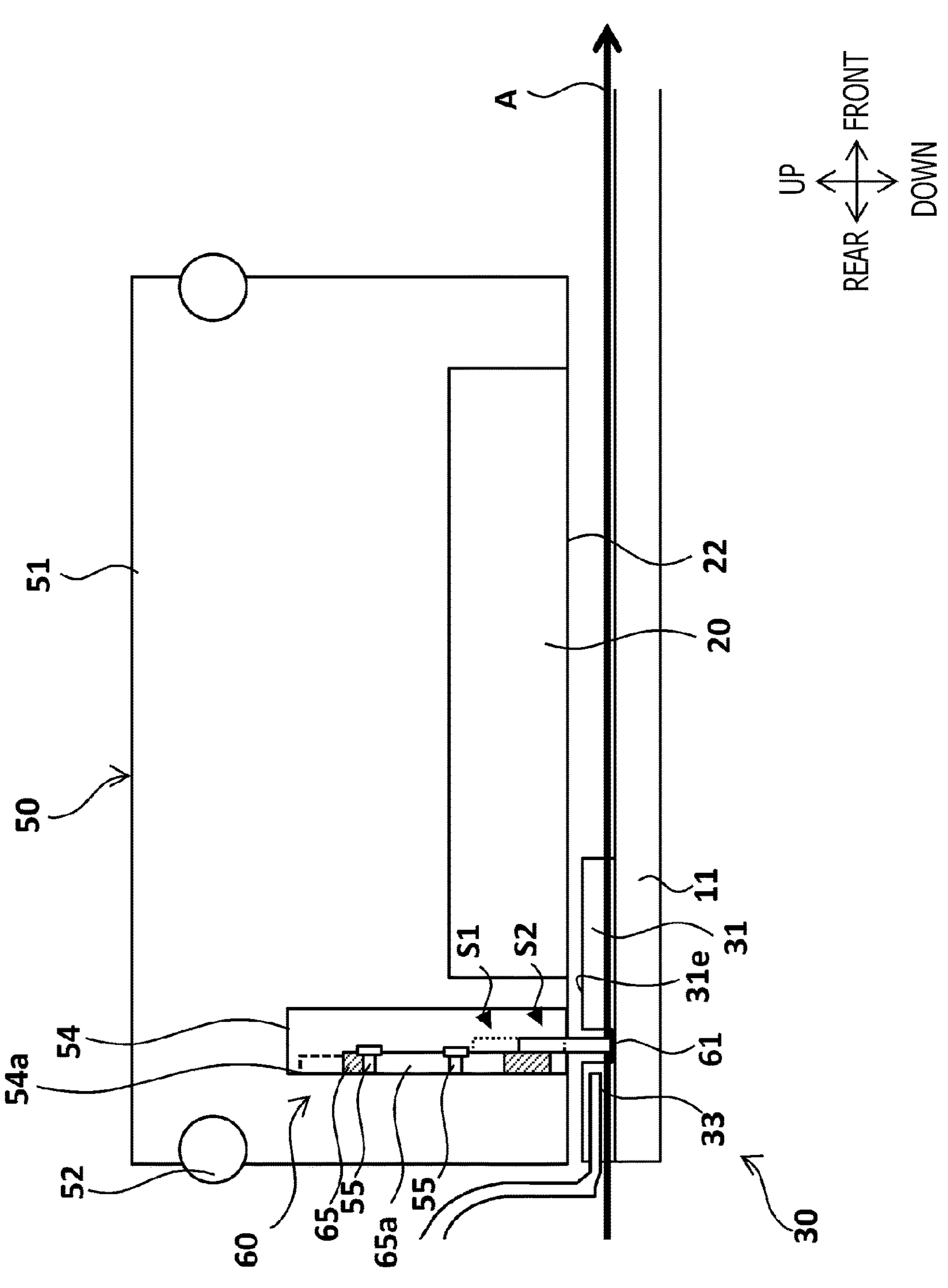
FIG. 11 is a sideward view of the carriage and the cutter in the printing apparatus in a second modified example.
Figure 12:
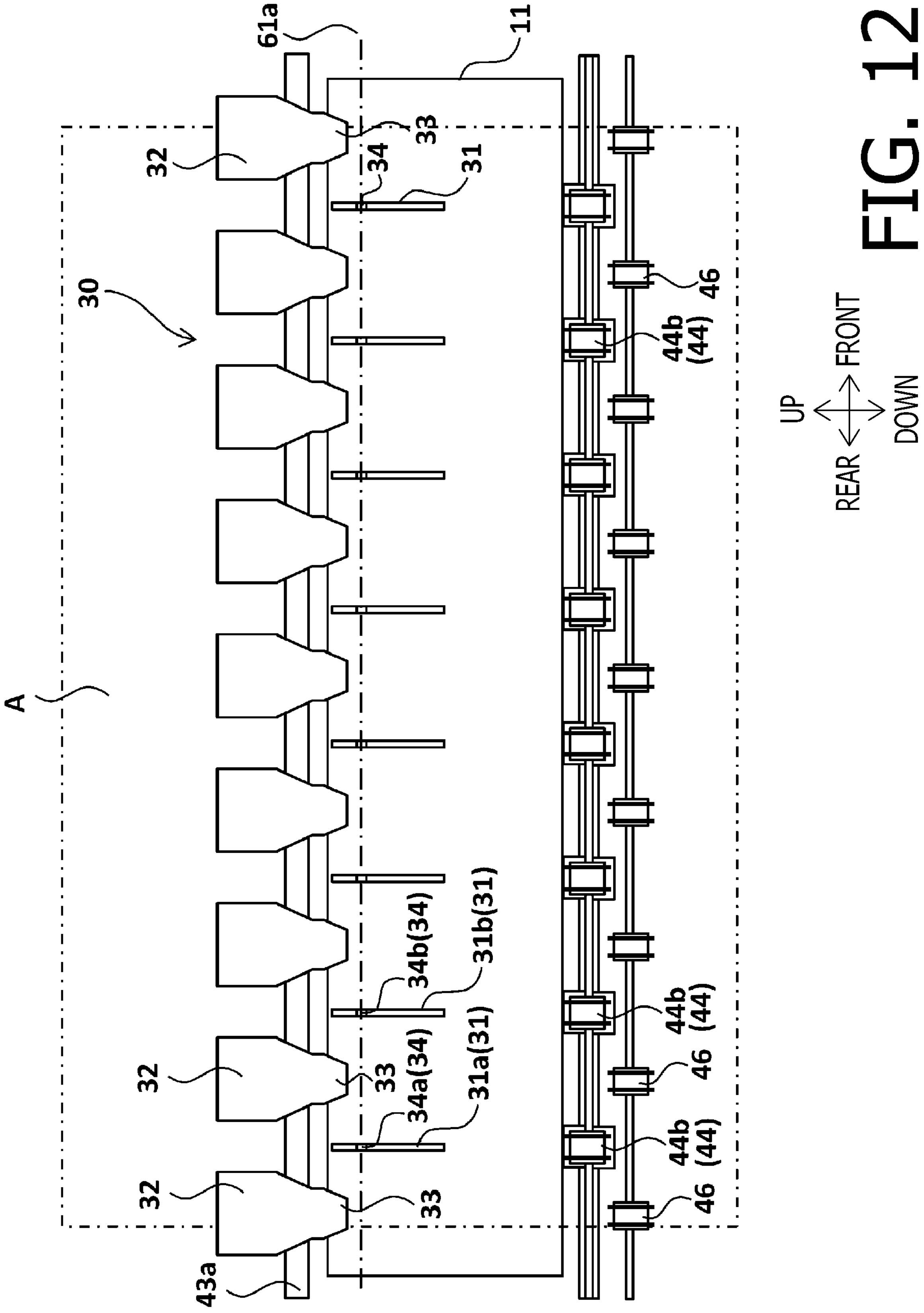
FIG. 12 is a top plan view of the corrugating member and the downstream rollers shown in FIG. 11.

The printing apparatus 10 in a second modified example has, similarly to the printing apparatus 10 in the first modified example, the cutter 60 mounted on the carriage 51, as shown in FIGS. 9, 11 and 12. Optionally, for example, the cutter 60 may be located rearward with respect to the head 20. For another example, optionally, the cutter 60 may be located between the head 20 and the presser portions 33 in the front-rear direction. For another example, optionally, the cutter 60 may be located between frontward ends of the ribs 31 and rearward ends of the ribs 31 in the front-rear direction. The ribs 31 include one or more first ribs 31*a* and one or more second ribs 31*b*. Each of the first ribs 31*a* may have a first cutout 34*a*, which is dented toward the platen 11 in the vertical direction, and each of the second ribs 31*b* may have a second cutout 34*b*, which is dented toward the platen 11 in the vertical direction. The first cutouts 34*a* and the second cutouts 34*b* may be located at positions at least partly coincident with one another in the front-rear direction. The cutter 60 may be located at a position, in which the cutter 60 may travel in the widthwise direction through the first cutouts 34*a* and the second cutouts 34*b*.

For example, the cutter 60 may be mounted on the carriage 51 movably in the vertical direction and may be located rearward with respect to the head 20. The blade 61 of the cutter 60 may be located frontward with respect to the presser portions 33 and rearward with respect to the head 20. In this arrangement, the printing apparatus 10 may be downsized in the front-rear direction. The blade 61 may be located above the ribs 31 at a position frontward with respect to the rear ends of the ribs 31 and rearward with respect to the frontward ends of the ribs 31 to overlap the ribs 31 in a view along the vertical direction. In this arrangement, a dimension of the printing apparatus 10 in the front-rear direction that may otherwise be increased by the volume of the cutter 60 may be reduced.

In the cutter 60, when the solenoid 68 is inactive, the blade 61 is located at the retracted position S1 above the printing medium A and stowed in the cavity 54. On the other hand, when the solenoid 68 is active, the blade 61 is located at the cutting position S2 in the conveyer path where the printing medium A is conveyed. In the cutting position S2, the blade 61 is in an arrangement such that the lower end thereof is at a position lower than the upper ends 31*e* of the ribs 31 and higher than the platen 11 so that the lower end of the blade 61 may not interfere with the printing medium A while the image is being printed on the printing medium A.

Figure 13A:
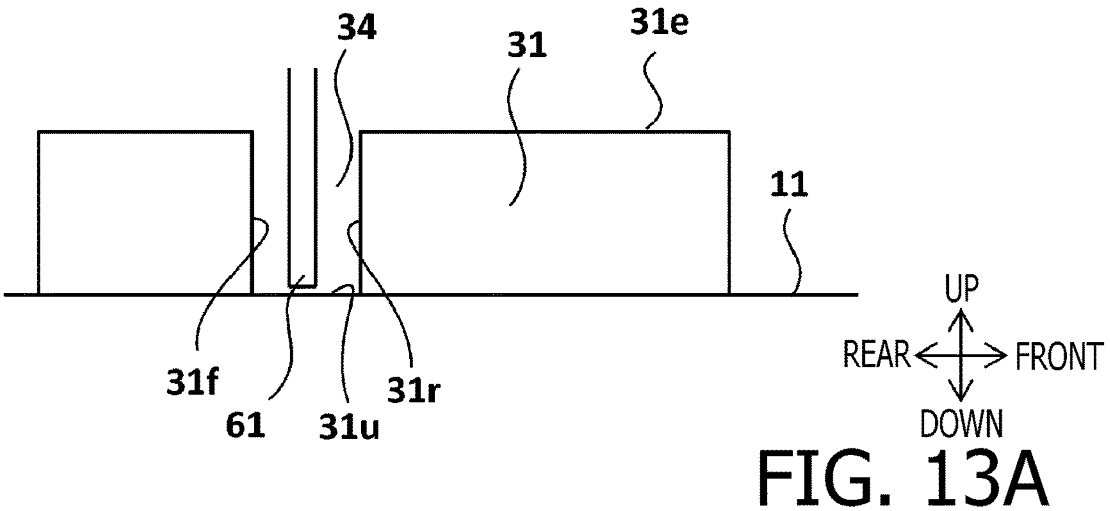
FIG. 13A is a sideward view of a rib and a blade shown in FIG. 11.

The ribs 31 have the cutouts 34. the cutouts 34 are located frontward with respect to the presser portions 33 and rearward with respect to the head 20. Each cutout 34 is dented downward from an upper end 31*e* of the rib 31 and is formed through the rib 31 in the widthwise direction. As shown in FIG. 13A, frontward surfaces 31*a* of the ribs 31 that form rear ends of the cutouts 34 are located rearward with respect to a rear end of the blade 61. Rearward surfaces 31*r* of the ribs 31 that form front ends of the cutouts 34 are located frontward with respect to a front end of the blade 61. Upward surfaces 31*u* of the ribs 31 that form lower ends of the cutouts 34 are located to be lower than the upper ends 31*e* of the ribs 31 and the lower end of the blade 61 at a position equal to or higher than the upper surface of the platen 11 in the vertical direction. In other words, the lower ends of the cutouts 34 may be on a same plate as the upper surface of the platen 11. In this arrangement, the blade 61 may travel in the widthwise direction through the cutouts 34, which are formed of the frontward surfaces 31*f*, the rearward surface 31*r*, and the upward surfaces 31*u*. Optionally, in the arrangement where the upward surfaces 31*u* of the ribs 31 are on the same plane as the upper surface of the platen 11, the upper surface of the platen 11 may work as the upward surfaces 31*u*.

As shown in FIG. 12, in the ribs 31 that align in the widthwise direction, the cutouts 34 may be in the same form, e.g., rectangular form, and in the equal size. The cutouts 34 may be located at the same position in the front-rear direction, aligning in line along the widthwise direction, to overlap one another in a view along the widthwise direction. In this arrangement, as indicated by a dash-and-dot line 61*a* in FIG. 12, the blade 61 may move linearly in the widthwise direction through the cutouts 34.

In the printing process, the controller 70 may inactivate the solenoid 68 to locate the blade 61 at the retracted position S1 and operate the conveyer 40 to convey the printing medium A frontward on the platen 11. In this arrangement, the printing medium A may be corrugated by the presser portions 33 and the ribs 31 in the corrugating member 30. The controller 70 may operate the head 20 to discharge the ink to print an image in the ink on the printing medium A. When the image to be included in a single piece of the printing medium A is printed on the printing medium A, the controller 70 may operate the conveyer 40 to stop conveying and the head 20 to stop discharging the ink. When the head 20 stops discharging the ink, a blank area, in which no image is printed, may be created between the rear end A1 of the image printed on the printing medium A and the position of the cutter 60. The part of the printing medium A containing the blank area may be discarded, but the discarded printing medium A may increase running cost of the printing apparatus 10. Therefore, the controller 70 may operate the conveyer 40 to convey the printing medium A rearward on the platen 11 and, when a position on the printing medium A distanced rearward from the rear end of the printed image on the printing medium A by a predetermined margin comes to coincide with the position of the cutter 60, stop conveying the printing medium A thereat. While the printing medium A is at this position, where the position on the printing medium A distanced rearward from the rear end of the printed image on the printing medium A by the predetermined margin coincides with the position of the cutter 60, the controller 70 may activate the solenoid 68 and move the carriage 51 in the widthwise direction. Thereby, the blade 61 may move in the widthwise direction at the cutting position S2 between the presser portions 33 and the head 20 to cut the printing medium A. Thus, the part of the printing medium A located rearward with respect to the cutting position S2 may be conveyed frontward by the upstream roller 43, and the part of the printing medium A located frontward with respect to the cutting position S2 may be conveyed frontward by the downstream roller 44. Thereafter, the controller 70 may inactivate the solenoid 68, move the blade 61 from the cutting position S2 to the retracted position S1 to stow the blade 61 in the cavity 54, and operate the conveyer 40 to convey the printing medium A frontward.

Thus, the printing medium A, corrugated by the corrugating member 30, may be restrained from contacting the head 20 while an image is being printed by the head 20. Moreover, the cutter 60 is mounted on the carriage 51; therefore, a dedicated mechanism to move the cutter 60 in the widthwise direction may be omitted, and a number of parts to be manufactured may be reduced. Furthermore, the cutter 60 is located rearward with respect to the head 20 in the front-rear direction; therefore, an unprinted blank area in the printing medium A after being cut may be reduced. Furthermore, the cutter 60 may be located between the head 20 and the presser portions 33 in the front-rear direction; therefore, the cutter 60 may cut the printing medium A, restrained by the corrugating member 30 from curling, easily.

Moreover, the printing apparatus 10 may print the image to be included in a single piece of the printing medium A in the condition where the printing medium A is supported both by the upstream roller 43 and the downstream roller 44. In this arrangement, whether the rear end A1 enters the restrictive zone B may not be a problem. After the image to be included in the single piece of the printing medium A is printed on the printing medium A, the controller 70 may operate the conveyer 40 to convey the printing medium A rearward on the platen 11 and, when a position on the printing medium A distanced rearward from the rear end of the printed image on the printing medium A by a predetermined margin comes to coincide with the position of the cutter 60, operate the cutter 60 to cut the printing medium A. Thereby, while the length to cut the printing medium A in the front-rear direction may differ each time, wasting of the printing medium A may be reduced.

Figure 13B:
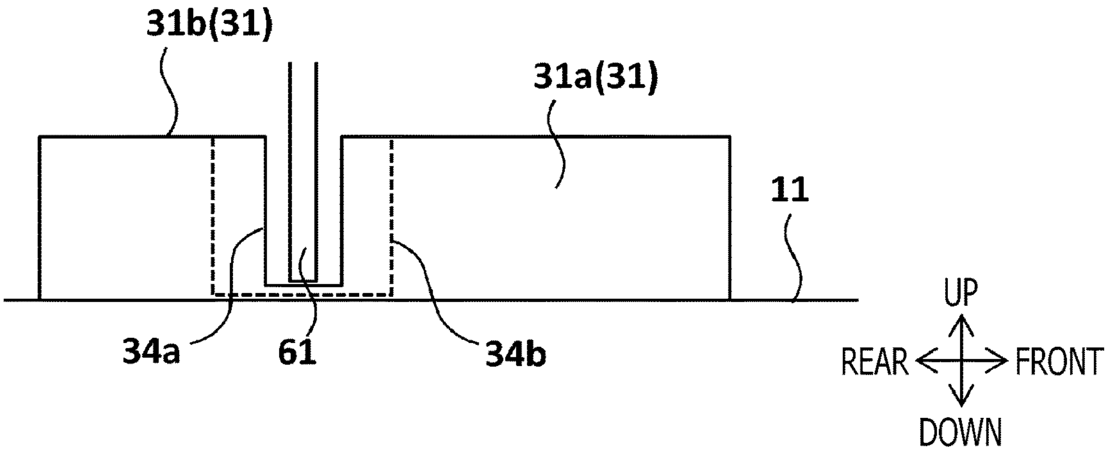
FIGS. 13B-13C are sideward views of a rib and a blade in another printing apparatuses.
Figure 13C:
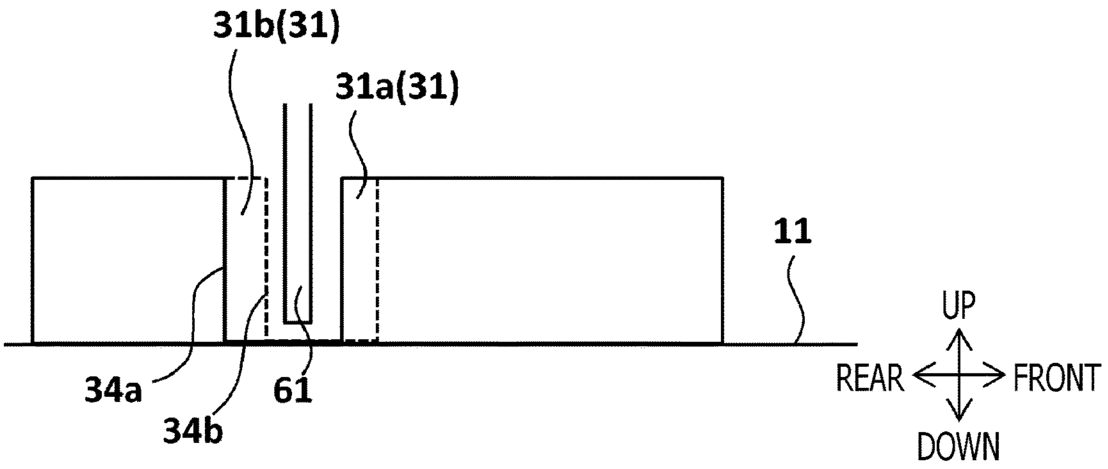

According to the second modified example, as shown in FIG. 13A, the cutouts 34 may be in the same form and the equal size. In this arrangement, the cutouts 34 may overlap one another in the view along the widthwise direction such that the first cutouts 34*a* in the first ribs 31*a* and the second cutouts 34*b* in the second ribs 31*b* may overlap entirely. In this regard, however, the arrangement of the cutouts 34 may not necessarily be limited to that described above as long as the blade 61 moving linearly in the widthwise direction is enabled to travel through the cutouts 34. For example, as shown in FIG. 13B, the second cutouts 34*b* may be larger than the first cutouts 34*a*, and, in the view along the widthwise direction, the second cutouts 34*b* may partly overlap the entirety of the first cutouts 34*a*. The blade 61 may travel in the widthwise direction through the first cutouts 34*a* and the second cutouts 34*b* in the overlapping range. For another example, as shown in FIG. 13C, the first cutouts 34*a* and the second cutouts 34*b* may be in the same form and in the equal size but may be displaced from each other in the widthwise direction. In this arrangement, in the view along the widthwise direction, the parts of the first cutouts 34*a* and the parts of the second cutouts 34*b* may overlap one another. The blade 61 may travel in the widthwise direction through the first cutouts 34*a* and the second cutouts 34*b* in the overlapping range.

Concerning the second modified example, optionally, the cutter 60 may be located frontward with respect to the ribs 31 at a position between the head 20 and the presser portions 33 in the front-rear direction. In this arrangement, the rear end A1 and the front end of the printing medium A may be restrained from being raised by the ribs 31; therefore, the printing medium A may be restrained from contacting the head 20. Moreover, the printing apparatus 10 may print the image to be included in a single piece of the printing medium A in the condition where the printing medium A is supported both by the upstream roller 43 and the downstream roller 44. In this arrangement, whether the rear end A1 enters the restrictive zone B may not be a problem. After the image to be included in the single piece of the printing medium A is printed on the printing medium A, the controller 70 may operate the conveyer 40 to convey the printing medium A rearward on the platen 11 and, when a position on the printing medium A distanced rearward from the rear end of the printed image on the printing medium A by a predetermined margin comes to coincide with the position of the cutter 60, operate the cutter 60 to cut the printing medium A. Thereby, while the length to cut the printing medium A in the front-rear direction may differ each time, wasting of the printing medium A may be reduced.

More Examples

Concerning the embodiment and the first and second modified examples described above, for example, the controller 70 may operate the head 20 to print an image on the printing medium A, operate the conveyer 40 to convey the printing medium A rearward on the platen 11, and, when a position on the printing medium A distanced rearward from the rear end of the printed image on the printing medium A by a predetermined margin comes to coincide with the position of the cutter 60, stop conveying the printing medium A thereat. For another example, the controller 70 may operate the head 20 to print an image on the printing medium A, operate the conveyer 40 to convey the printing medium A rearward on the platen 11, and, when the rear end of the printed image on the printing medium A comes to coincide with the position of the cutter 60 without reserving a margin in the area rearward from the rear end of the printed image on the printing medium A, stop conveying the printing medium A thereat. In this arrangement, the printing apparatus 10 may provide so-called no-margin printing.

The present disclosure is applicable to a printing apparatus, in which an image is printable on a printing medium unrolled from a roll, while the printing medium may be restrained from being smeared.

What is claimed is:

1. A printing apparatus, comprising:

a platen configured to support a printing medium unrolled from a roll, the roll being formed of the printing medium being rolled;

a conveyer configured to convey the printing medium on the platen in a first direction;

a head configured to print an image on the printing medium supported by the platen at a position on one side of the platen in a second direction, the second direction intersecting with the first direction;

a corrugating member configured to corrugate the printing medium;

a cutter configured to cut the printing medium, a carriage having the head mounted thereon, the carriage being configured to move the head in a third direction, the third direction intersecting with the first direction and the second direction; and a controller, wherein the cutter is mounted on the carriage, wherein the corrugating member comprises:

a plurality of ribs aligning spaced from one another in the third direction, the plurality of ribs protruding from the platen in the second direction; and presser portions configured to press the printing medium toward the platen at intervening positions between adjoining ones of the plurality of ribs, wherein the cutter is located at a position upstream with respect to the head in the first direction, wherein the cutter is located between the head and the presser portions in the first direction, wherein the cutter is located between ends of the plurality of ribs on one side in the first direction and the other ends of the plurality of ribs on the other side in the first direction, wherein the plurality of ribs includes a first rib and a second rib, wherein the first rib has a first cutout, the first cutout being dented toward the platen in the second direction, wherein the second rib has a second cutout, the second cutout being dented toward the platen in the second direction, wherein at least a part of the first cutout and at least a part of the second cutout are located at a same position in the first direction, wherein the cutter is configured to move in the third direction passing through the first cutout and the second cutout, wherein the controller is configured to control the conveyer to convey the printing medium upstream in the first direction to move a position on the printing medium distanced upstream from an upstream end of the image printed on the printing medium by a predetermined margin to a position coincident with the position of the cutter in the first direction, and wherein the controller controls the cutter to cut the printing medium when the position on the printing medium distanced upstream from the upstream end of the image printed on the printing medium by the predetermined margin comes to the position coincident with the position of the cutter in the first direction.

2. The printing apparatus according to claim 1, wherein the second cutout is larger than the first cutout, and wherein the second cutout partly overlaps entirety of the first cutout in the second direction.

3. The printing apparatus according to claim 1, wherein the first cutout and the second cutout are in a same form and in an equal size but are displaced from each other in the first direction.

4. A printing apparatus, comprising:

a platen configured to support a printing medium unrolled from a roll, the roll being formed of the printing medium being rolled;

a conveyer configured to convey the printing medium on the platen in a first direction;

a head configured to print an image on the printing medium supported by the platen at a position on one side of the platen in a second direction, the second direction intersecting with the first direction;

a corrugating member configured to corrugate the printing medium;

a cutter configured to cut the printing medium, a carriage having the head mounted thereon, the carriage being configured to move the head in a third direction, the third direction intersecting with the first direction and the second direction; and a controller, wherein the cutter is mounted on the carriage, wherein the corrugating member comprises:

a plurality of ribs aligning spaced from one another in the third direction, the plurality of ribs protruding from the platen in the second direction; and presser portions configured to press the printing medium toward the platen at intervening positions between adjoining ones of the plurality of ribs, wherein the cutter is located at a position upstream with respect to the head in the first direction, wherein the cutter is located between the head and the presser portions in the first direction, wherein the cutter is located between ends of the plurality of ribs on one side in the first direction and the other ends of the plurality of ribs on the other side in the first direction, wherein the plurality of ribs includes a first rib and a second rib, wherein the first rib has a first cutout, the first cutout being dented toward the platen in the second direction, wherein the second rib has a second cutout, the second cutout being dented toward the platen in the second direction, wherein at least a part of the first cutout and at least a part of the second cutout are located at a same position in the first direction, wherein the cutter is configured to move in the third direction passing through the first cutout and the second cutout, wherein the controller is configured to control the conveyer to convey the printing medium upstream in the first direction by a first conveying amount, wherein the controller is configured to control the conveyer to stop conveying the printing medium in the first direction when an upstream end of the image printed on the printing medium comes to a position coincident with the position of the cutter without reserving a margin from the upstream end of the image printed on the printing medium, and wherein the controller is configured to control the cutter to cut the printing medium without reserving the margin from the upstream end of the image printed on the printing medium when the conveyer stops conveying the printing medium in the first direction.

5. The printing apparatus according to claim 4, wherein the controller is configured to control the conveyer to convey the printing medium upstream in the first direction selectively by a second conveying amount to move a position on the printing medium distanced upstream from the upstream end of the image printed on the printing medium by a predetermined margin to the position coincident with the position of the cutter, and wherein the second conveying amount is shorter than the first conveying amount.

6. The printing apparatus according to claim 4, wherein the second cutout is larger than the first cutout, and wherein the second cutout partly overlaps entirety of the first cutout in the second direction.

7. The printing apparatus according to claim 4, wherein the first cutout and the second cutout are in a same form and an equal size but are displaced from each other in the first direction.

* * * * *